(12) United States Patent
Rangwala et al.

(10) Patent No.: US 8,275,201 B2
(45) Date of Patent: Sep. 25, 2012

(54) IMAGE ENHANCEMENT AND APPLICATION FUNCTIONALITY FOR MEDICAL AND OTHER USES

(75) Inventors: Hussain S. Rangwala, Edina, MN (US); Douglas James Duchon, Chanhassen, MN (US)

(73) Assignee: Tyco Healthcare Group LP, Mansfield, MA (US)

( * ) Notice: Subject to any disclaimer, the term of this patent is extended or adjusted under 35 U.S.C. 154(b) by 809 days.

(21) Appl. No.: 12/398,927

(22) Filed: Mar. 5, 2009

(65) Prior Publication Data

US 2009/0226063 A1 Sep. 10, 2009

Related U.S. Application Data

(60) Provisional application No. 61/034,442, filed on Mar. 6, 2008.

(51) Int. Cl.
G06K 9/34 (2006.01)
(52) U.S. Cl. ......... 382/173; 382/128; 382/254; 382/274
(58) Field of Classification Search ................. 382/128, 382/131, 133, 173, 195, 203, 243, 305, 254, 382/274; 380/201; 600/407, 419; 128/922; 375/E7.04; 705/57
See application file for complete search history.

(56) References Cited

U.S. PATENT DOCUMENTS

| | | | |
|---|---|---|---|
| 4,907,156 A | 3/1990 | Doi et al. | |
| 5,396,347 A | 3/1995 | Kaneko | |
| 5,588,071 A | 12/1996 | Schultz | |
| 5,657,362 A | 8/1997 | Giger et al. | |
| 5,740,267 A | 4/1998 | Echerer et al. | |
| 5,923,383 A | 7/1999 | Kim | |
| 6,088,473 A | 7/2000 | Xu et al. | |
| 6,532,380 B1 | 3/2003 | Close et al. | |
| 6,585,755 B2 | 7/2003 | Jackson et al. | |
| 6,875,176 B2 | 4/2005 | Mourad et al. | |
| 7,043,064 B2 | 5/2006 | Paik et al. | |
| 7,043,066 B1 | 5/2006 | Doi et al. | |
| 7,058,220 B2 | 6/2006 | Obrador | |
| 7,155,045 B2 | 12/2006 | Rick et al. | |
| 7,184,582 B2 | 2/2007 | Giger et al. | |
| 7,231,070 B2 | 6/2007 | Bjorn et al. | |
| 7,233,689 B2 | 6/2007 | Haupert et al. | |
| 7,308,126 B2 | 12/2007 | Rogers et al. | |
| 7,457,656 B2 * | 11/2008 | Judd et al. | 600/407 |
| 8,086,007 B2 * | 12/2011 | Yan et al. | 382/128 |

(Continued)

FOREIGN PATENT DOCUMENTS

WO     WO 2006/056924     6/2006

OTHER PUBLICATIONS

International Search Report and Written Opinion Received in PCT/US09/036240 Dated Jul. 6, 2009.

(Continued)

*Primary Examiner* — Anh Hong Do
(74) *Attorney, Agent, or Firm* — Alana T. Bergman, Esq.

(57) ABSTRACT

The disclosure herein provides beneficial systems, methods, devices, and apparatuses that enhance and/or analyze images, and that can be configured to provide users an assessment and/or recommendation based on the enhanced and/or analyzed images. In an embodiment related to medicine, the assessment and/or recommendation is based on a patient situation, dimensions of patient organs/lumens, or the like in order to achieve personalized medicine.

20 Claims, 22 Drawing Sheets

U.S. PATENT DOCUMENTS

| | | |
|---|---|---|
| 2005/0013471 A1 | 1/2005 | Snoeren et al. |
| 2005/0043614 A1 | 2/2005 | Huizenga et al. |
| 2006/0211071 A1 | 9/2006 | Andre et al. |
| 2008/0018645 A1 | 1/2008 | Dwyer et al. |

OTHER PUBLICATIONS

Yingpeng Jin et al. *Contrast Enhancement by Multi-scale Adaptive Histogram Equalization*. Department of Biomedical Engineering, Columbia University, New York, NY; Department of Radiology, Columbia-Presbyterian Medical Center, New York, NY. Wavelets: Applications in Signal and Image Processing IX, Proc. SPIE vol. 4478, p. 206-213, Dec. 2001.

J.D. Schuijf et al. *Feasibility of coronary stent imaging with multi-slice computed tomography*. European Journal of Radiology Extra, vol. 50, Issue 2, May 2004, p. 59-62. (Abstract).

Laurent Letourneau-Guillon et al. *CT and MR Imaging of Nitinol Stents with Radiopaque Distal Markers*. Journal of Vascular and Interventional Radiology, vol. 15, p. 615-624, 2004. (Abstract).

Shankar Sridharan et al. *Optimizing imaging after coarctation stenting: The clinical utlity of multi-detector computer tomography*. Catherization and Cardiovascular Interventions, vol. 66, Issue 3, p. 420-423, 2005. (Abstract).

\* cited by examiner

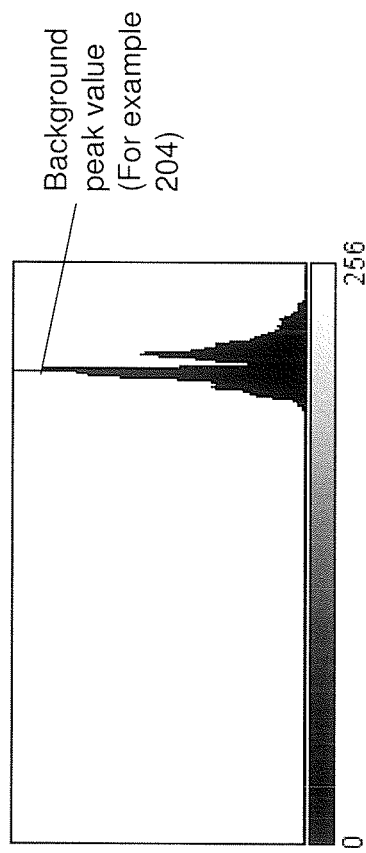

Background peak value (For example 204)

Figure 8A

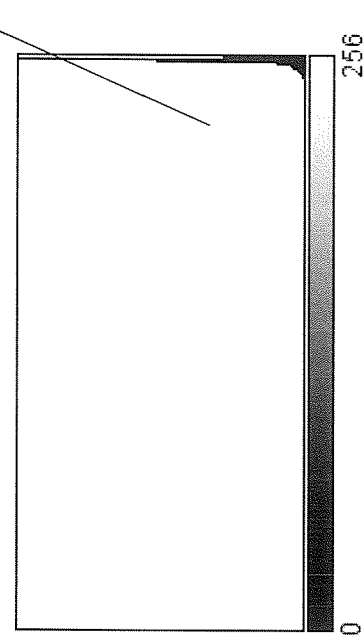

Subtract this background value from the entire image.
Note: There are no pixel values that are significantly less than the background value so there are very few negative values that are approximated as 0.

After subtraction, the pixel values are reduced to Actual Pixel Intensity − Background Intensity. In order to display the image back on a 256 level gray scale, the pixel intensity values are normalized with respect to the maximum pixel intensity value

Figure 8B

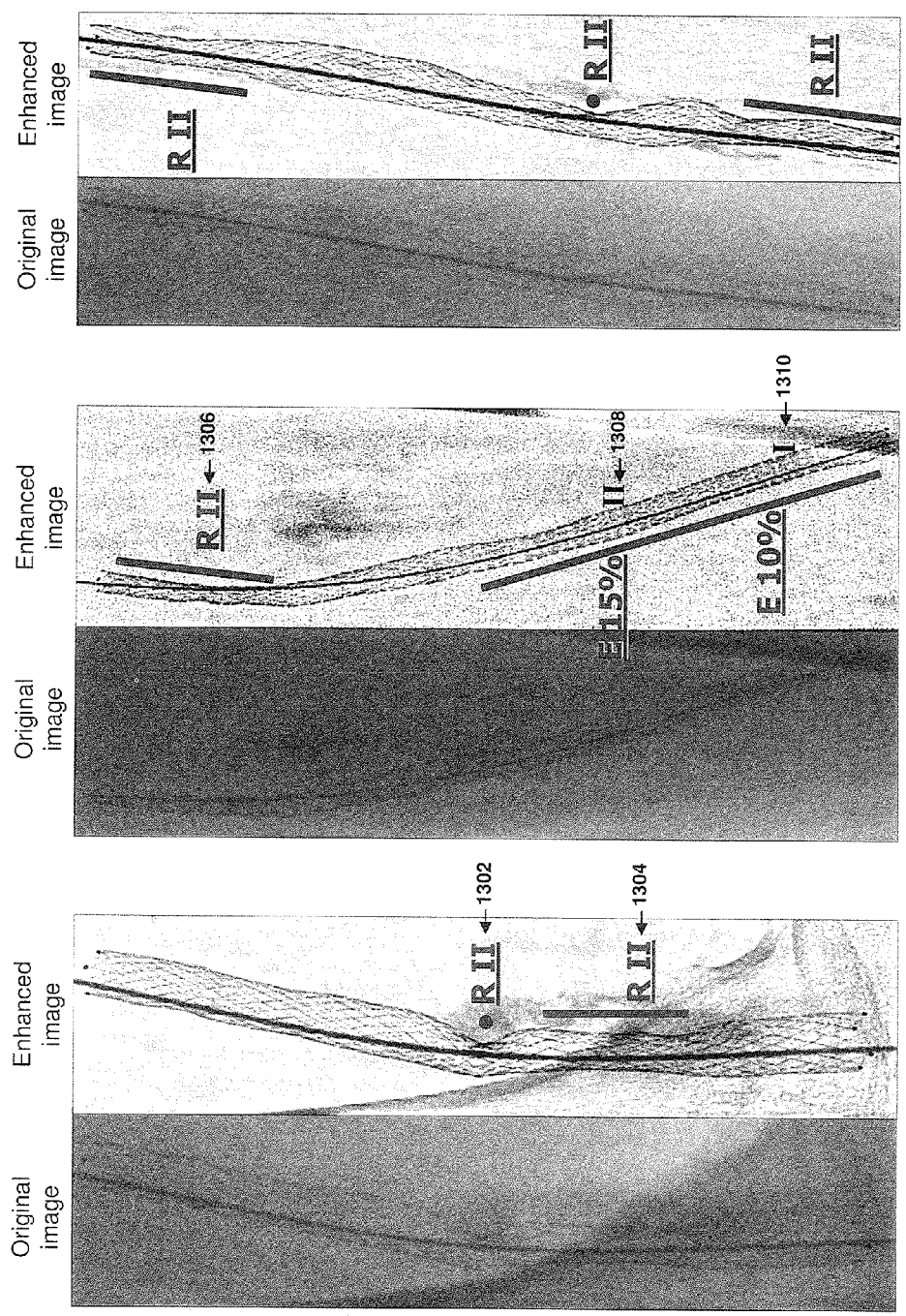

Normal Stent and Single Slice Profile

Elongated Stent and Single Slice Profile

Plaque Hardness Estimations

Different Regions of Interest Along the Length of the Vessel

Contrast Flow After Stenting Or During Atherectomy

Contrast Flow Before Stenting

Figure 21

IMAGE ENHANCEMENT AND APPLICATION FUNCTIONALITY FOR MEDICAL AND OTHER USES

CROSS-REFERENCE TO RELATED APPLICATIONS

The present application claims the benefit under 35 U.S.C. §119(e) to U.S. Provisional Application No. 61/034,442, filed Mar. 26, 2008, which is hereby incorporated by reference in its entirety, including specifically but not limited to the devices, systems, and methods relating to image enhancement of devices, and the applications of such techniques disclosed therein.

BACKGROUND

1. Field

Embodiments of the invention relate to the general field of image enhancement, and, in particular, to methods, systems, and devices for applying image enhancement techniques for viewing medical/treatment devices in situ and/or other devices to determine the status, condition, delivery, positioning, deterioration, usefulness, and the like of such devices.

2. Description of the Related Art

With the development of new technologies, devices can be inserted into patients, buildings, or other areas and/or places wherein it is difficult to visualize the device after it has been implanted or installed. For example, it is difficult to visualize a stent or other medical/treatment device after it has been implanted into an artery/vessel/lumen or other area of the body without having to performing an invasive surgery. The same is generally true for any other devices installed into an area that is hidden from view. In certain circumstances, it may be possible to view such devices using an imaging apparatus employing an imaging modality, such as X-ray, magnetic resonance imaging (MRI), sonar, ultrasound, or other like. The images, however, produced from such imaging apparatuses can be of poor quality wherein visualization of the data can be difficult such that the user cannot make a decision about the device.

SUMMARY

Embodiments of the invention described herein are directed to image enhancement for medical and other uses. Other embodiments are directed to a computer-based evaluation of a medical or other image.

In an embodiment, a computer-implemented method for evaluating a stent in situ is provided, the computer-implemented method comprising accessing a computer accessible database to obtain at least one medical image; selecting a region of interest in the at least one medical image, wherein the region of interest comprises the stent in situ, wherein the stent comprises a plurality of cells; cropping the region of interest from the at least one medical image to generate a cropped image; identifying the background of the cropped image; subtracting pixels from the cropped image, wherein the subtracted pixels represent the background; normalizing a grayscale of the cropped image; adjusting contrast of the cropped image to produce a first enhanced image; and outputting the first enhanced image to the user.

The computer-implemented method can further comprise applying an unsharp mask filter to the enhanced image. In an embodiment, the computer-implemented method further comprises measuring intensity values of different pixels in the first enhanced image; and calculating a quantitative characteristic of the first enhanced image based on the measured intensity values. In an embodiment, the method steps are performed in the order listed above. The computer-implemented method can further comprise identifying a first vertex of a first cell in the stent within the first enhanced image; identifying a second vertex of the first cell in the stent within the first enhanced image; determining a distance between the first and the second vertexes, wherein the distance is correlated to stent elongation; accessing a computer accessible index to determine whether the distance exceeds a threshold value for stent elongation; and outputting a recommendation to the user related to the stent if the distance exceeds the threshold value.

In an embodiment, the computer-implemented method can further comprise identifying an angle formed within a cell in the stent within the first enhanced image; determining a number of degrees in the angle; accessing a computer accessible index to determine whether the number of degrees exceeds a threshold value for stent elongation; and outputting a recommendation to the user related to the stent if the number of degrees exceeds the threshold value. In an embodiment, the angle is formed by a peak or valley within the cell. In an embodiment, the outputting outputs a recommendation related to the stent if the angle formed by the peak or valley is 29 degrees or less. In an embodiment, the outputting outputs a recommendation related to the stent if the angle formed by the peak or valley is 21 degrees or less. In an embodiment, the angle is formed near a cell interconnection area and is within the cell. In an embodiment, the outputting outputs a recommendation related to the stent if the angle is 60 degrees or more. In an embodiment, the outputting outputs a recommendation related to the stent if the angle is 70 degrees or more.

The computer-implemented method can further comprise analyzing a line profile of the first enhanced image, wherein the line profile is taken across the width of the stent; determining the metal coverage of the line profile; accessing a computer accessible index to determine whether the metal coverage is below a threshold value correlated to stent elongation; and outputting a recommendation to the user related to the stent if the metal coverage is below the threshold value. In an embodiment, the computer-implemented method further comprises accessing the computer accessible database to obtain a second medical image, wherein the second medical image comprises an image of the stent in situ at a different time; processing the second medical image to produce a second enhanced medical image; determining one or more disparities between the second enhanced medical image and the first enhanced image; accessing a computer accessible index to determine whether the one or more disparities exceed a threshold value; and outputting to the user a recommendation related to the stent if the one or more disparities exceed the threshold value.

The computer-implemented method can further comprise determining in the first medical image a first distance between a first vertex of a first cell in the stent and a second vertex of the first cell in the stent; determining in the second medical image a second distance between the first vertex of the first cell in the stent and the second vertex of the first cell in the stent; wherein the one or more disparities is based on a difference in the first distance and the second distance. In an embodiment, the computer-implemented method further comprises determining in the first medical image a first number of degrees in a first angle between a first cell in the stent; determining in the second medical image a second number of degrees in a second angle the first cell; wherein the one or more disparities is based on a difference the first angle and the second angle.

In an embodiment, the computer-implemented method can further comprise determining in the first medical image a first metal coverage in a line profile; determining in the second medical image a second metal coverage in the line profile; wherein the one or more disparities is based on a difference in the first metal coverage and the second metal coverage.

In another embodiment, a computer-implemented method for evaluating a medical image, comprises obtaining a medical image of a desired location within a patient; measuring pixel intensity at one or more regions of interest of the medical image; and calculating a quantitative characteristic of the desired location based on the measured pixel intensity. In an embodiment, the computer-implemented method further comprises comparing the quantitative characteristic with one or more predetermined threshold values. In an embodiment, the medical image is of an implanted stent. In an embodiment, the quantitative characteristic is elongation of the stent. In an embodiment, the quantitative characteristic is radial compression of the stent. In an embodiment, the medical image is of a stenosed blood vessel. The computer-implemented method can further comprise outputting to a user a desired treatment modality based on the calculated quantitative characteristic.

In another embodiment, a system for enhancing a medical image comprises an image processing module configured to select a region of interest in the medical image, and to crop the region of interest from the medical image to generate a cropped image; an image background subtraction module configured to identify and subtract background pixels of the cropped image, and normalize a grayscale of the cropped image; a contrast adjustment module configured to adjust contrast of the cropped image to generate a first enhanced image; an output module configured to output the first enhanced image to a user; and the system comprising a process and memory.

In another embodiment, a computer-implemented method for processing a medical image comprises accessing a computer accessible database to obtain at least one medical image; selecting a region of interest in the at least one medical image, wherein the region of interest comprises a vessel; cropping the region of interest from the at least one medical image to generate a cropped image; identifying background pixels of the cropped image; subtracting the background pixels from the cropped image, wherein the subtracted pixels represent the background; normalizing a grayscale of the cropped image; adjusting contrast of the cropped image to generate an enhanced image; and outputting the enhanced image to the user.

In another embodiment, a system for generating an assessment report of an image comprises a communications module for accessing a secure network connection between a remote image enhancement and analysis system; a storage repository configured to store threshold values relating to specific devices or conditions; a data manager module configured to receive data values from the remote image enhancement and analysis system through the communications module, and to store the data values in the storage repository; a threshold reassessment module configured to recalculate the threshold values based on data values related to the threshold values and to store recalculated threshold values in the storage repository; and an assessment module configured to receive a request and measured values from the remote image enhancement and analysis system through the communications module, wherein the request is to compare the measured values to related threshold values.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

The foregoing and other features, aspects and advantages of the present invention are described in detail below with reference to the drawings of various embodiments, which are intended to illustrate and not to limit the invention. The drawings comprise the following figures in which:

FIG. 8A depicts an example histogram of the cropped image in FIG. 7B.

FIG. 8B depicts an example histogram of the cropped image in FIG. 7B with the background pixels subtracted.

FIGS. 13A, 13B, and 13C are examples images depicting areas of stent radial compression and areas of stent elongation.

FIG. 21 is an example form used for generating and/or collecting clinical data.

DETAILED DESCRIPTION OF THE PREFERRED EMBODIMENTS

Figure 1:
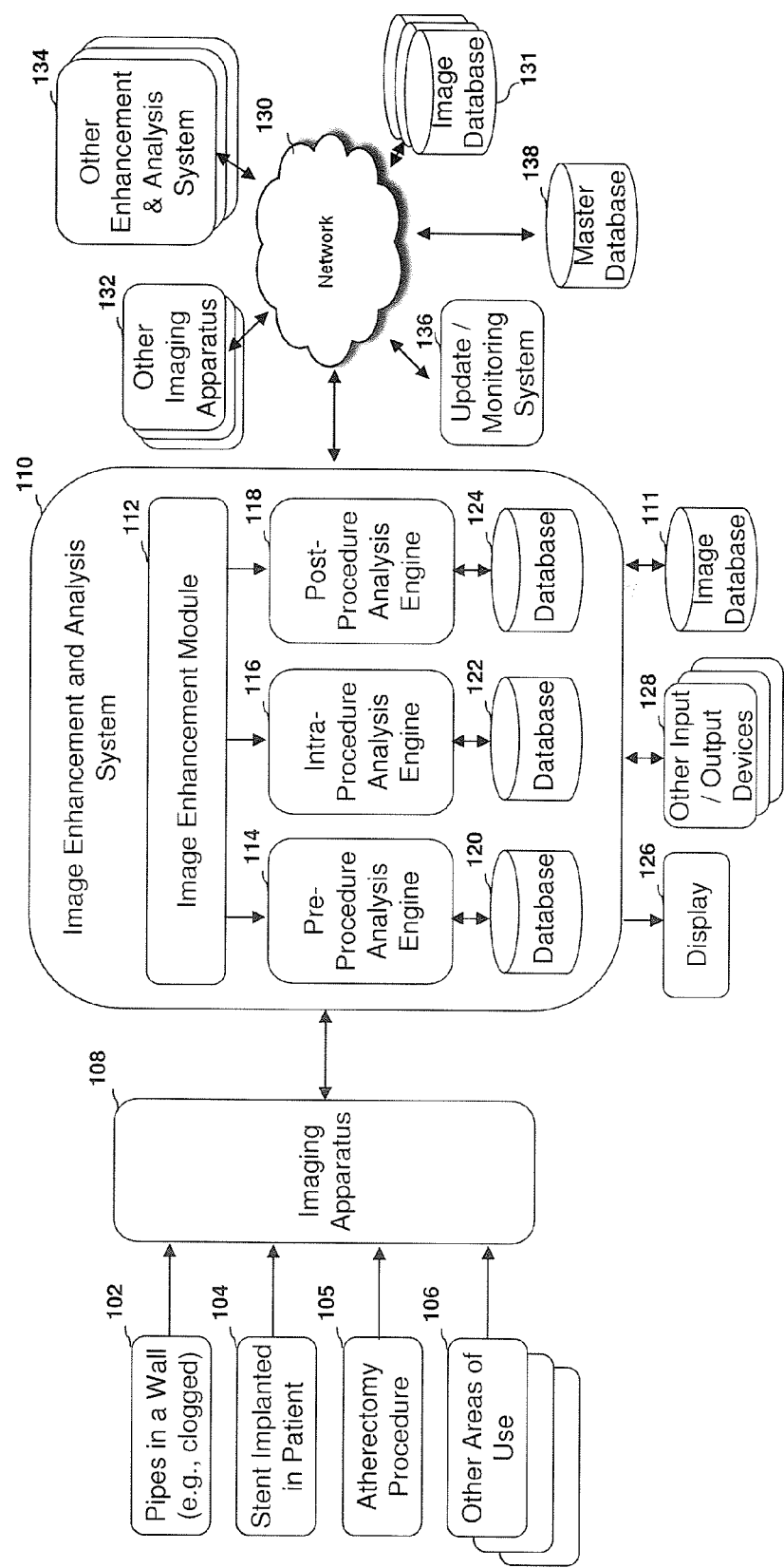
FIG. 1 is a block diagram depicting a high level overview of one embodiment of a system for image enhancement and analysis.

Although several embodiments, examples and illustrations are disclosed below, it will be understood by those of ordinary skill in the art that the invention described herein extends beyond the specifically disclosed embodiments, examples and illustrations and includes other uses of the invention and obvious modifications and equivalents thereof. Embodiments of the invention are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, embodiments of the invention can comprise several novel features and no single feature is solely responsible for its desirable attributes or is essential to practicing the inventions herein described.

As used herein, the terms "stenosis," "stricture," and "coarctation" can be interchangeably used, and generally and broadly refer to an abnormal narrowing in a blood vessel and/or other lumen or tubular organ and/or structure.

The terms "imaging device" or "imaging apparatus," as they are used herein, can be interchangeably used, and generally and broadly include without limitation any device employing any imaging modality, such as but not limited to X-ray, magnetic resonance imaging (MRI), sonar, ultrasound, and other imaging techniques.

The terms "image," and "medical image," as used herein, can be interchangeably used, and generally and broadly refer to any type of image or depiction of a device (for example, medical devices, pipes, vessels, wires, or other apparatuses), and may include without limitation medical images, x-ray images, MRI images, sonar images, ultrasound images, OCT image, CAT scan, CT scan, PET scan, SPECT scan, fluoroscopy, static images, movie images, two dimensional images, three dimensional images, 8 bit images, 16 bit images, 32 bit images, 64 bit images, or the like.

As used herein, the terms "user," "physician," "doctor," are broad interchangeable terms used to generally and broadly refer to any user of the systems, methods, devices described herein, and can include without limitation a user, physician, doctor, technician, operator, nurse, professional, or the like.

The term "data repository" as used herein generally refers to any storage medium located in any system, location, device or the like, and can include without limitation a hard drive, a database, a removable medium (for example, tape, disc, optical disc, thumb drive, RAM, ROM, or the like), wherein each may be part of a device (for example, imaging device), system, computer, machine, appliance, equipment, or the like.

As used herein, the terms "radial compression," "incomplete expansion," and "residual stenosis" can be interchangeably used herein, and are broad terms that generally refer to a reduction in the diameter of the stent, radial compression of the stent, incomplete expansion of the stent, residual stenosis, or the like.

In reviewing images obtained from an imaging device, users typically review unenhanced (as-received) images using the naked eye in order to make qualitative assessments of the image. Due to subtle differences in the grayscale of the images, features of the image can be obfuscated, hidden, and/or blocked from the naked eye.

For example, in analyzing medical images, doctors typically review an unenhanced (as-received) medical image and make a qualitative assessment of the image using the naked eye. This is done, for example, when a doctor or technician analyzes a medical image of an implanted stent to assess the stent (e.g., is the stent fractured, elongated, etc.). Due to the subtleties of the grayscale medical image, it can be difficult for a physician or other user to differentiate between the grayscales, and as a result, physicians or other users can sometimes inadvertently misdiagnose a patient or misinterpret a medical image. For instance, a doctor may review the medical image and determine that a stent is normally implanted, when in fact it is actually fractured, but the doctor was unable to see the fracture because the grayscale differential of the medical image was too subtle.

Intensifying the contrast of the medical image alone may not rectify this problem. The background can be still incorporated in the image and can be intensified as well, thereby still not allowing visualization of stent struts alone. As such, the subtleties of the grayscale image, even in the intensified image, can still make it difficult to read the contrast. Another issue that can be addressed in image enhancement is that it is a visualization of a physical object and, as such, in enhancing the image, its integrity should be kept intact. Any image enhancement that is performed on the original image should not distort the "data" embedded within the image. If any distortion of the image data occurs, then the image can be considered compromised and can be of diminished value as a medical assessment and treatment tool.

Accordingly, there is a need for way to enhance images to make it easier to review while not compromising or distorting the underlying physical data embedded within the image.

Additionally, the review of images is highly subjective and qualitative, and depends largely on the user's experience and training. Therefore, it would be beneficial for users to have a system that enhances and analyzes images to provide the user an assessment and/or recommendation and/or alarm based on standardized and/or quantitative data. Using the enhanced image, the system could more accurately obtain measurements in the image and/or other quantitative data from the image, and the measurements could then be correlated to a database having threshold values for various scenarios, devices, medical devices, environments, physicians, patients, techniques, surgical tools/equipment, or the like. For example, the database could be configured to store threshold values unique to a specific stent of a particular size, made from a definite material, by a certain manufacturer in a specific year. The threshold values can be used to generate recommendations/alarms to users, such as suggested treatment modalities, or suggested treatment devices, or the like, and such recommendations can be unique to the patient situation, condition, disease, or the like to achieve personalized medicine. The threshold values can be developed by reviewing and/or categorizing clinical data, clinical outcomes, device performance parameters, medical society guidelines, and other similar research.

For example, the review of medical images by physicians is highly qualitative and subjective and depends, to a great extent, on a physician's experience and training. However, even where a physician is highly trained, there may be interrelated variables that are not fully appreciated by the physician that have a bearing on a proper diagnosis, variables such as stent architecture, compliance of the vessel, treatment modalities, device operation, vessel information, among other variables. Accordingly, there is also a need for a system and method that can use an enhanced image to provide a physician with an assessment of a patient's situation that takes into account a number of interrelated variables, such as those mentioned above, that are often beyond the physician's expertise. Such an assessment system could be useful in diagnostic/procedural/predictive environments before a procedure or course of action; during a procedure as a feedback tool; or as a predictive tool or even post-procedure to quantify and evaluate the efficacy of the procedure or even as a predictive tool to assess the potential long-term outcome of the procedure.

Accordingly, the disclosure herein provides beneficial systems, methods, devices, and apparatuses that enhance and/or analyze images, and that can be configured to provide users an assessment and/or recommendation based on the enhanced and/or analyzed images. In an embodiment related to medicine, the assessment and/or recommendation is based on a patient situation, dimensions of patient organs/lumens, or the like in order to achieve personalized medicine.

With reference to FIG. 1, there is illustrated a block diagram depicting a high level overview of one embodiment of an image enhancement and analysis system 110. In the depicted embodiment, an image enhancement and analysis system 110 can be directly connected to an imaging apparatus 108, and can be connected through a network 130 to a plurality of other imaging apparatuses 132, other image enhancement and analysis systems 134, other update/monitoring systems 136, and other master databases 138.

In FIG. 1, the image enhancement and analysis system 110 is connected, directly or indirectly, to imaging apparatus 108 in order to receive images to be enhanced and analyzed. In other embodiments, the image enhancement and analysis system 110 can be connected to and receive images from an image database 111, or the image enhancement and analysis system 110 can be connected to and receive images through a network 130 that is connected to remote image databases 131. Generally, images can be generated by an imaging apparatus 108, 132. For example, an x-ray imaging apparatus can generate an image of a clogged pipe in a wall 102, a stent implanted in a patient, an atherectomy procecedure 105, or in other situations 106 wherein a user requires imaging a device or area that is hidden from view or not easily visualized with the naked eye.

As illustrated in FIG. 1, the image enhancement and analysis system 110 can comprise a plurality of modules including but not limited to an image enhancement module 112, a pre-procedure analysis engine module 114, an intra-procedure analysis engine module 116, and a post-procedure analysis engine module 118. In certain embodiments, the pre-procedure analysis engine module 114, the intra-procedure analysis engine module 116, and the post-procedure analysis engine module 118 are connected to databases 120, 122, 124 to retrieve and/or store data. For example, the image enhancement and analysis system 110 can be configured to use image enhancement module 112 to enhance the image received/obtained from imaging apparatus 108, and the enhanced image can then be further analyzed and/or processed using the pre-procedure analysis engine module 114, the intra-procedure analysis engine module 116, and/or the post-procedure analysis engine module 118. In analyzing and/or processing the enhanced image, the image enhancement module 112, the pre-procedure analysis engine module 114, the intra-procedure analysis engine module 116, and/or the post-procedure analysis engine module 118 can be configured to generate a report, recommendation, feedback, or the like based on threshold values and other data stored in the databases 120, 122, 124. The enhanced image as well as the report, recommendation, feedback, or the like can be outputted on display device 126 and/or other output devices 128.

In reference to FIG. 1, the image enhancement and analysis system 110 can be connected to an update/monitoring system 136 through network 130. In certain embodiments, the update/monitoring system 136 is configured to monitor the image enhancement and analysis system 110, and/or the other image enhancement and analysis systems 134 to ensure that the systems are working properly and accurately. The update/monitoring system 136 can be configured to update/add/delete/modify (on a batched, delayed, real-time, substantially real-time, and/or periodic basis) the software, protocols, procedures, methods, and the like of the image enhancement module 112, the pre-procedure analysis engine module 114, the intra-procedure analysis engine module 116, and/or the post-procedure analysis engine module 118, the databases 120, 122, 124, and any other module and/or apparatus in or connected to the image enhancement and analysis system 110.

With reference to FIG. 1, the update/monitoring system 136 can be configured to receive (on a batched, delayed, real-time, substantially real-time, and/or periodic basis) data, reports, recommendations, feedback, or the like from image enhancement and analysis system 110, and other image enhancement and analysis systems 134 to store such data in master database 138. Such data can increase the amount of information and/or feedback available for improving, altering, modifying the threshold valves stored in the databases 120, 122, 124 and used by the pre-procedure analysis engine module 114, the intra-procedure analysis engine module 116, and/or the post-procedure analysis engine module 118. In certain embodiments, the update/monitoring system 136 is configured to use such data to modify and/or improve (on a batched, delayed, real-time, substantially real-time, and/or periodic basis) the threshold values and store such modified threshold values in the master database 138. The update/monitoring system 136 can be configured to update (on a batched, delayed, real-time, substantially real-time, and/or periodic basis) databases 120, 122, 124 with the modified threshold values stored in master database 138.

In reference to FIG. 1, the image enhancement and analysis system 110 can be located at or near the site of the imaging apparatus 108, or the image enhancement and analysis system 110, 134 can be located at a remote location from the imaging apparatus 108, 132. In certain embodiments, the image enhancement and analysis system 110, 134 is operated as an application services provider (ASP) model wherein the computer image enhancement and analysis services are provided over a secure network 130 in order to offer users on-demand software services.

With reference to FIG. 1, the pre-procedure analysis engine module 114 can be configured to analyze the enhanced image received/sent from the image enhancement module 112 to output a recommendation on how to proceed before a procedure. In an embodiment related to medicine, the recommendation on how to proceed is based on the patient situation, dimensions of patient organs/lumens, or the like in order to achieve personalized medicine. In the medical context, the pre-procedure analysis engine module 114 can be, for example, configured to analyze a medical image of a vessel to output a recommendation as to an appropriate treatment modality (for example, angioplasty, stenting, etc.) and/or a suggested/recommended treatment device (for example, 5 mm stent) to be used. In certain embodiments, the intra-procedure analysis engine module 116 can be configured to analyze the enhanced image received/sent from the image enhancement module 112 to output a recommendation based on statistical and/or clinical significance and/or other data on how to proceed during a procedure. In the medical context, the intra-procedure analysis engine module 116 can be, for example, configured to analyze a fluoroscopy medical image (or a plurality of medical images taken sequentially over time or taken at different times) of a stent being implanted into a vessel to output feedback (for example, an appropriate speed for deploying the stent into the vessel) to the physician performing the surgery. The feedback can be based on detected changes or disparities in measurements taken in the images, and/or whether the changes or disparities exceed or are below a threshold value. In certain embodiments, the post-procedure analysis engine module 118 can be configured to analyze the enhanced image received/sent from the image enhancement module 112 to output a recommendation on what to do after a procedure. In the medical context, the post-procedure analysis engine module 118 can be, for example, configured to output a report as to the success of a procedure (for example, stent properly deployed, proper device placement, predicted device durability) or to output a report as to the condition of a implanted device (for example, stent elongated beyond threshold value, and/or likely to fracture).

Figure 2:
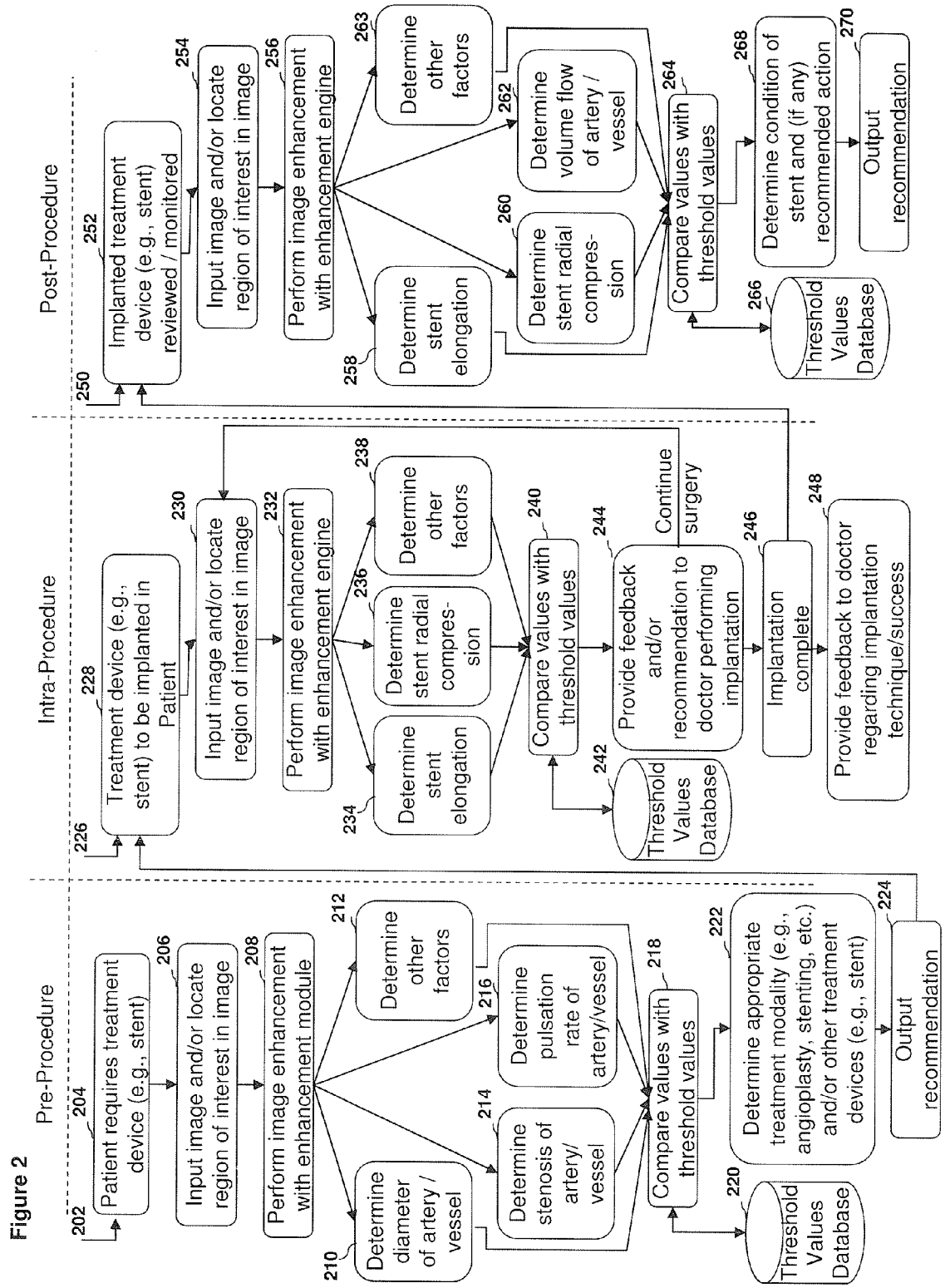
FIG. 2 is a block diagram depicting a high level overview of one embodiment of a system flow for the image enhancement and analysis system.

As illustrated in FIG. 2, there is depicted an example high-level process flow diagram of an embodiment of employing the image enhancement module 112, the pre-procedure analysis engine module 114, the intra-procedure analysis engine module 116, and the post-procedure analysis engine module 118. Although this high-level process flow diagram is in the medical context, one skilled in the art will understand that this high-level process flow diagram can be adapted to other contexts, such as in the plumbing context, welding industry context, oil exploration context, or the like.

With reference to FIG. 2, the image enhancement module 112 can be configured to receive/obtain an image at point 202 for a patient requiring implantation of a treatment device 204. At block 206, the image enhancement module 112 can be configured to locate the region of interest in the image automatically, semi-automatically, or the region of interest can be located manually by the user. In certain embodiments, the region of interest can be focused on a particular portion of a vessel such that the rest of the image can be cropped out of the image. At block 208, the image enhancement module 112 can be configured to perform image enhancement of the cropped image. In certain embodiments, the pre-procedure analysis engine module 114 can be configured at block 210 to determine the length/distance of the object at issue, for example, the diameter of an artery or vessel. In certain embodiments, the pre-procedure analysis engine module 114 can be configured at block 214 to determine the condition of the object at issue, for example the severity of stenosis of an artery or vessel. In certain embodiments, the pre-procedure analysis engine module 114 can be configured at block 216 to determine the activity of the object at issue, for example the pulse rate of an artery or vessel. In certain embodiments, the pre-procedure analysis engine module 114 can be configured at block 212 to determine other factors, attributes, and/or characteristics of the object at issue, for example, the presence of previous medical intervention.

In reference to FIG. 2, the various factors, attributes, characteristics, and measurements obtained at blocks 210, 212, 214, 216 are compared with stored threshold values at block 218. In certain embodiments, the threshold values are stored in threshold database 220 or other database 120. Based on the foregoing comparison, the pre-procedure analysis engine module 114 can be configured at block 222 to determine an appropriate treatment modality (for example, angioplasty, stenting, atherectomy, or the like), and/or determine a suggested treatment device for implantation (for example, 5 mm stent, 6 mm stent, or other device). The recommendation and/or determination from block 222 can be outputted to the user at block 224.

As illustrated in FIG. 2, the physician can review the recommendation and/or determination from block 224 and perform the suggested procedure at block 228. Alternatively, a physician at point 226 could have determined the appropriate procedure and/or medical device to use without the assistance of the image enhancement and analysis system 110. At block 230, the image enhancement module 112 can be configured to retrieve, locate, obtain, receive an image, and/or locate the region of interest in the image automatically, semi-automatically, or the region of interest can be located manually by the user. In certain embodiments, the region of interest can be focused on a particular portion of a vessel such that the rest of the image can be cropped out of the image. At block 232, the image enhancement module 112 can be configured to perform image enhancement of the cropped image. In certain embodiments, the intra-procedure analysis engine module 116 can be configured at block 234 to determine the length/distance of the object at issue, for example, the degree to which an implanted stent is elongated beyond its design length In certain embodiments, the intra-procedure analysis engine module 116 can be configured at block 236 to determine the condition of the object at issue, for example the severity of radial compression on a partially and/or completely implanted stent. In certain embodiments, the intra-procedure analysis engine module 116 can be configured at block 238 to determine other factors, attributes, and/or characteristics of the object at issue, for example, the diameter of a partially and/or completely implanted stent.

In reference to FIG. 2, the various factors, attributes, characteristics, and measurements obtained at blocks 234, 236, 238 are compared with stored threshold values at block 240. In certain embodiments, the threshold values are stored in threshold database 242 or other database 122. Based on the foregoing comparison, the intra-procedure analysis engine module 116 can be configured at block 244 to determine and/or provide feedback and/or recommendation to the physician performing the surgery (for example, accelerate sheath withdrawal to more quickly deploy the stent, remove the stent (or if removal of the stent is not possible a warning or caution can be outputted) due to irregular elongation, or the like). Other feedback parameters can include without limitation positioning recommendations, technique recommendations, application of force recommendations, additional treatment recommendations and/or suggested use of other tools. The physician can continue the surgery based on the feedback and optionally take another image of the patient and input into the image enhancement module 112 at block 230, and repeat the foregoing process. Alternatively, the procedure or implantation is complete at block 246. Based on one or more of the last or final image and intra-procedural images of the patient, surgical site, and/or device, the intra-procedure analysis engine module 116 can at block 248 output to the surgeon, physician, and/or user feedback, a success report, recommendations for improving surgical technique.

As illustrated in FIG. 2, a physician and/or user, in certain embodiments, will want to monitor and/or review the condition or status of an implanted object or device (for example, the condition of an implanted stent) at block 252. This process could proceed shortly after or long after performing a procedure at block 246, or this process could proceed shortly after or long after a procedure at point 250. At block 254, the image enhancement module 112 can be configured to locate the region of interest in the image automatically, semi-automatically, or the region of interest can be located manually by the user. In certain embodiments, the region of interest can be focused on a particular portion of a vessel having an implanted stent, such that the rest of the image can be cropped out of the image. At block 256, the image enhancement module 112 can be configured to perform image enhancement of the cropped image. In certain embodiments, the post-procedure analysis engine module 118 can be configured at block 258 to determine the length/distance of the object at issue, for example, the elongation of an implanted stent. In certain embodiments, the post-procedure analysis engine module 118 can be configured at block 260 to determine the condition of the object at issue, for example the severity of radial compression by an artery or vessel on the stent. In certain embodiments, the post-procedure analysis engine module 118 can be configured at block 262 to determine the activity of the object at issue, for example the volume flow of an artery or vessel. In certain embodiments, the post-procedure analysis engine module 118 can be configured at block 263 to determine other factors, attributes, and/or characteristics of the object at issue, for example, the degree to which a newly implanted stent overlaps a previously implanted stent.

In reference to FIG. 2, the various factors, attributes, characteristics, and measurements obtained at blocks 258, 260, 262, 263 are compared with stored threshold values at block 264. In certain embodiments, the threshold values are stored in threshold database 266 or other database 124. Based on the foregoing comparison, the post-procedure analysis engine module 118 can be configured at block 268 to determine the condition of the stent and/or the recommended treatment modality (for example, angioplasty, stenting, atherectomy, or the like), if any. The recommendation and/or determination from block 268 can be outputted to the user at block 270.

Figure 3:
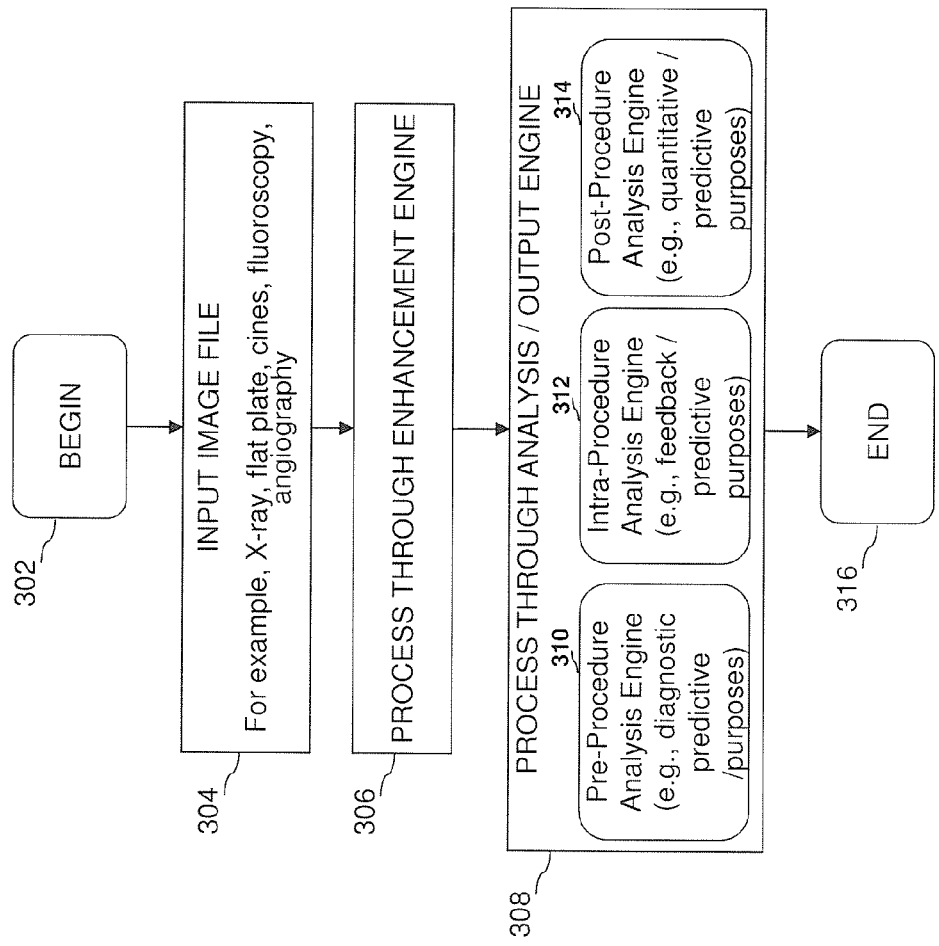
FIG. 3 depicts an example high-level flow diagram for an embodiment of the image enhancement and analysis system.

With reference to FIG. 3, a general operating environment of an embodiment of an enhancement and an analysis system is illustrated. As indicated, the process can begin at block 302 where at block 304 an image (for example, x-ray image) is created, by way of example, as a flat plate, cine, fluoroscopy, angiography, or the like. The image can be an actual representation of a physical object, not an abstraction of it like a regular photograph because, for example, the pixel intensity of an x-ray is a result of the sum of the attenuation coefficients in the direction of an x-ray beam. If captured as an analog image, this image can be converted to a digital image for further processing. In the medical imaging context, this digital conversion can generally completed according to the Digital Imaging and Communications in Medicine (DICOM) standard.

With reference to FIG. 3, at block 306, the digital image in this embodiment is processed by an image enhancement module 112 by, in this embodiment, executing an image enhancement routine. The image enhancement routine, as described in detail below, subtracts out the noise (for example, background) from the image while maintaining data integrity, creating greater contrast between an region/area of interest and the background which allows for automated analysis of the image and allows for more effective manual analysis of the image. In this embodiment, at block 308, the enhanced image can be analyzed by an automated analysis/output engine which provides a physician more accurate and detailed information regarding a patient's state than a physician could determine on his own by manually reviewing the patient's medical image. For example, analysis engines 310, 312, 314 are depicted in block 308.

In reference to FIG. 3, such analysis engines could comprise a diagnostic/predictive engine (pre-procedure analysis engine module) 310 which would be directed to pre-procedure image analysis for assessing a patient's health condition. Such diagnostic/predictive analysis could, among other things, comprise assessing the condition of a diseased vessel (for example, assessing calcification, stenoses, vessel fragility, tortuosity, vessel compliance, geometry, or the like) and determining a course of therapy and/or recommendations based on the condition of the diseased vessel (for example, PTA, atherectomy, stenting, devices, etc.). Such analysis engines could comprise a feedback/predictive engine (intra-procedure analysis engine module) 312 which would be directed to procedure image analysis during a procedure to provide the physician with immediate feedback during the course of a procedure (for example, determining the position of a stent during placement, reviewing the technique and forces in play, assessing whether additional treatment will be necessary, possibly using interactive aides during the course of the procedure to assist with the procedure). Such analysis engines could also comprise a quantitative/predictive engine (post-procedure analysis engine module) 314 which would be directed to post-procedure image analysis for assessing the efficacy of the procedure. Such post-diagnostic analysis could, among other things, comprise assessing the durability of a placed stent; reviewing the placement of the stent, or the like.

Figure 4:
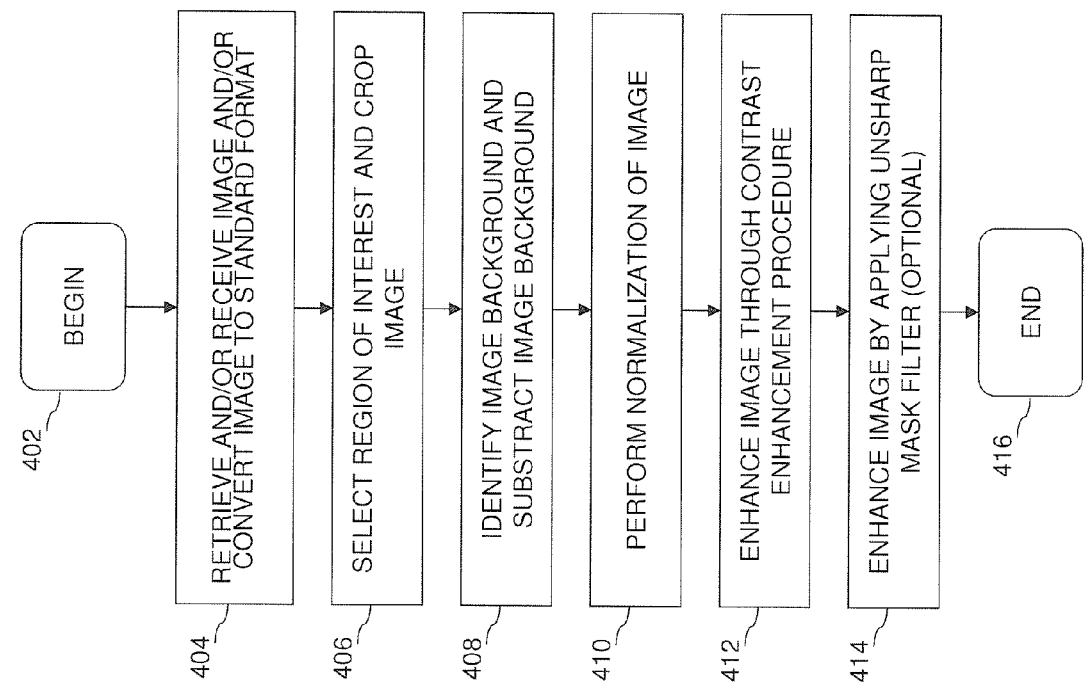
FIG. 4 depicts an example high-level flow diagram for an embodiment of the enhancement engine.

Referring now to FIG. 4, an embodiment of the process that can occur when the enhancement routine 306 is activated is illustrated. The process can begin at block 402 wherein the process either receives/obtains an image in a digital format at block 404, which can activate the routine, or the process retrieves a stored image in a digital format at a user's request. Alternatively, the process can obtain a stored image in digital format and convert the image into a standardized format, such as DICOM, GIF, JPG, or the like. At block 406, the system can automatically and/or semi-automatically, or the user can manually, select the region of interest and crop the image. In an embodiment, the region of interest is automatically determined having the system scan and/or analyze the image pixel line by pixel line to identify areas of bone or other large areas of high intensity pixels. By tagging the large areas of high intensity pixels, the system can crop out such areas from the image. One skilled in the art will appreciate that there are other methodologies for automatically identifying the region of interest and cropping the image. In an embodiments, the image is cropped because if the image was not cropped to a region of interest, then portions of the body not pertinent to the analysis may skew the image enhancement process. For example, if a variable intensity object, like bone, was left in the picture, it may skew the image measurement and, therefore, possibly disrupt enhancement. In certain embodiments, the image may be cropped so that only the contrasting objects relevant to the evaluation remain.

With regard to FIG. 4, the system can automatically and/or semi-automatically identify the image background at block 408. The background pixels can be subtracted by applying various methodologies, including without limitation the rolling ball radius method, the mean background value subtraction method, the seed segmentation method, or the like. In an embodiment, the system employs the rolling ball radius method wherein a local background value is determined for every pixel by averaging over a very large ball around the pixel. This value is hereafter subtracted from the original image, removing large spatial variations of the background intensities. The radius can be set to at least the size of the largest object that is not part of the background. The radius parameter can be 1 pixel, and in an embodiment, the radius parameter can be between 1-2 pixels.

In reference to FIG. 4, the system can automatically, semi-automatically, and/or manually normalize the pixels at block 410 after cropping and subtracting the background pixels from the image at block 408. One skilled in the art will appreciate the various ways to normalize the pixel values of the resulting image. At block 412, the system can automatically, semi-automatically, and/or manually enhance the image through a contract enhancement procedure. In an embodiment, the system can apply the Enhance Contrast procedure available in the ImageJ program (the Image Processing and Analysis in Java program). In an embodiment, for medical images, the parameters for the Enhance Contrast procedure are less than 2% saturation, and no histogram equalization. In an embodiment, the parameters are 1-2% saturation and no histogram equalization, and in further embodiments 1-1.1% saturation and no histogram equalization. Generally, if the image is noisy, improved results can be achieved with the saturation parameter less than 2%.

With reference to FIG. 4, the system can optionally apply an unsharp mask filter at block 414. In an embodiment, the mask weight parameter of the unsharp mask filter is between 0.6-08. For high contrast images, the mask weight parameter can be between 0.8-0.9, and for low contrast images, the mask weight parameter can be at 0.6. This filter can be used to sharpen the image quality and enable clear visualization of the fine structures in an object. Unsharp mask takes a pixel value of an image and blurs that to an intended degree using a Gaussian blur function to produce an unsharp mask. Then this mask is subtracted from the original image, and the contrast is normalized to compensate for the available gray values.

Figure 5:
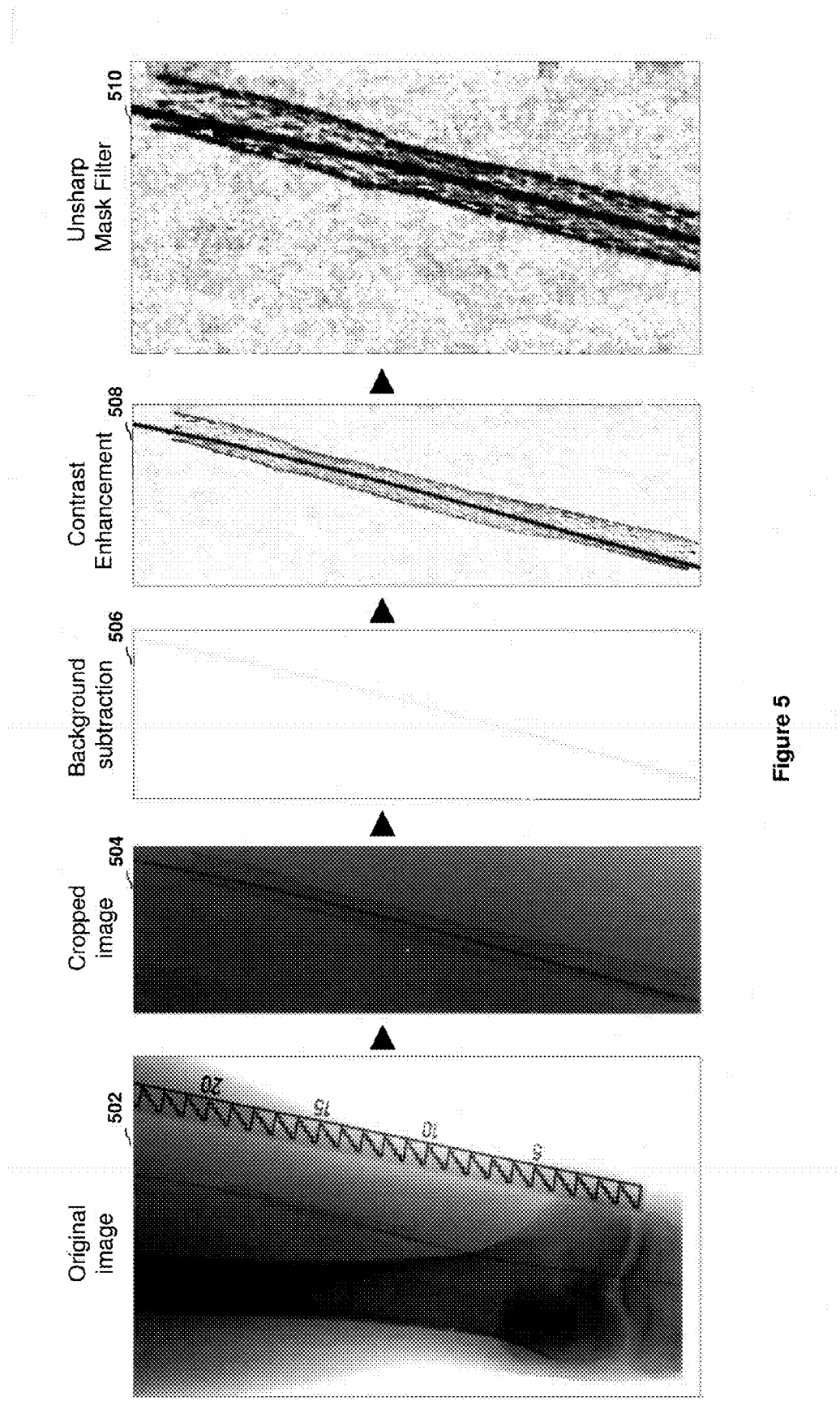
FIG. 5 depicts an example series of resulting images produced by one embodiment of the image enhancement and analysis system.

As illustrated in FIG. 5, there is depicted an example series of resulting images produced by one embodiment of the image enhancement and analysis system 110. The example original image 502 illustrates a stent positioned in front of a bone and next to a scale. In an embodiment, the example original image 502 can be inputted into the image enhancement module 112, which can be configured to identify the region of interest by locating and cropping out the area of the image where the bone exists to produce the cropped image 504. The image enhancement module 112 can also be configured to identify and subtract the background pixels in the cropped image to generate the background subtraction image 506. In an embodiment, the image enhancement module 112 is configured to apply a contrast enhancement to the background subtraction image to produce the contrast enhancement image 508. Optionally, the image enhancement module 112 can be configured to apply an unsharp mask filter to the contrast enhancement image 508 to generate the unsharp mask filter image 510 (shown magnified in FIG. 5), which more clearly shows the stent, which was nearly undetectable in the original image. In the enhanced image, the user can clearly measure the diameter of the stent and/or see stenosis and/or radial compression of the stent and/or elongation of the stent, and/or any other feature.

Figure 6B:
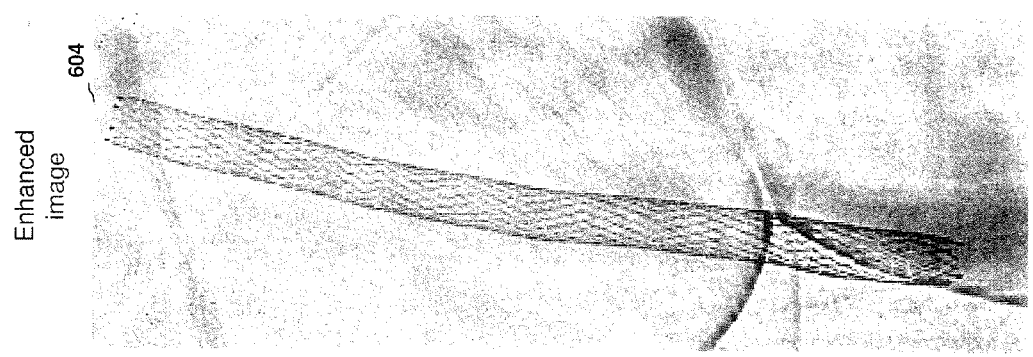
FIG. 6B depicts an example enhanced image resulting from one embodiment of the image enhancement and analysis system.
Figure 6A:
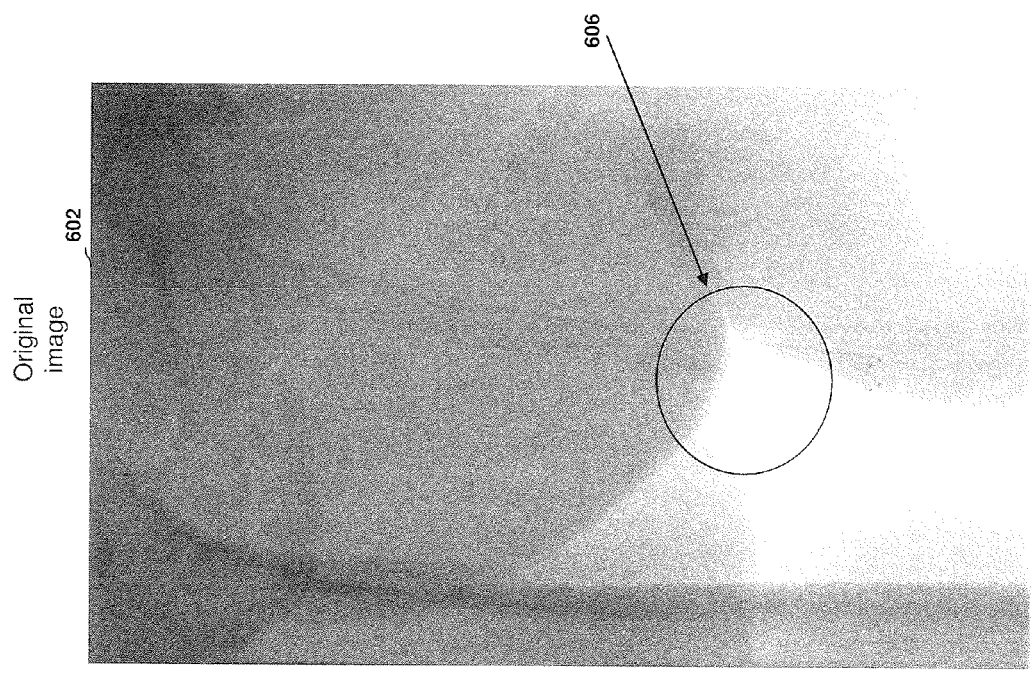
FIG. 6A is depicts an example original medical image.

In reference to FIGS. 6A and 6B, there is depicted another example original medical image 602, and an example enhanced image 604 resulting from one embodiment of the image enhancement and analysis system 110. The original image 602 shows pelvic bone at the top of the image and femoral bone on the left side. The region of interest is the stent located in the middle of the image. As can be seen, the stent is hardly visible in the original image 602. Further, in the highlighted area 606, a portion of the stent appears missing from the image. The pixel data for the missing portion of the stent exists within the image; however, it is obfuscated within the original image 602 due to possibly veiling glare. By processing the image through the image enhancement and analysis system 110, the missing portion of the stent and the rest of the stent can be made more visible as seen in the enhanced image 604.

Figures 7A, 7B:
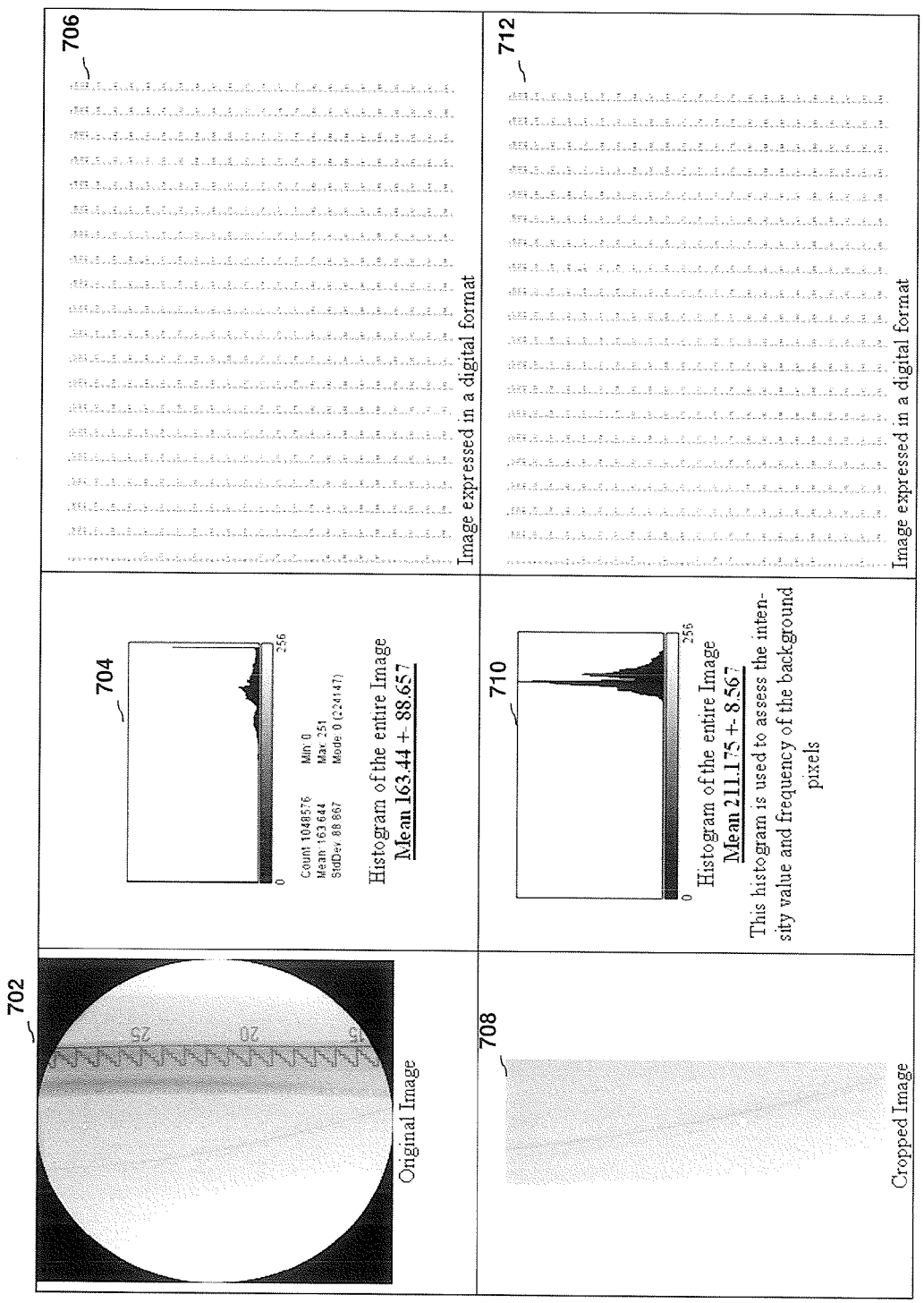
FIG. 7A depicts an example original digital x-ray image, a corresponding histogram of the original image, and a depiction of the original image expressed in digital format by pixel value.
FIG. 7B depicts an example cropped digital x-ray image, an example corresponding histogram of the cropped image, and an example depiction of the cropped image expressed in digital format by pixel value.

With reference to FIG. 7A, there is illustrated an original image 702, a corresponding histogram 704 of the original image 702, and the image expressed in digital format by pixel value 706. In the context of 16 bit gray scale medical imaging, a histogram is a graphical representation showing the frequency distribution of pixels across the possible 256 shades of gray. The x-axis of a histogram represents the possible 256 shades of gray that can be displayed in the image, and the y-axis represents the number of pixels existing in a particular shade of gray area. One of ordinary skill in the art will understand that the invention is not limited to use only with a "256" grayscale scale. A "256" scale is used herein by way of example only. The scale can be set based on any number of grayscales present in the initial input image. As discussed above with reference to FIG. 4, the system can be configured to identify a region of interest ("ROI") of the image and crop the image around that region at block 406. By way of example, an automated system could be set up to identify the ROI by discerning the differences in intensity between bones, stents and background. This step allows for follow-on operations. In reference to FIG. 7B, there is illustrated an example cropped image 708, a corresponding histogram 710 of the cropped image 708 and the cropped image expressed in digital format by pixel 712.

In reference to FIG. 8A, there is illustrated a histogram of the cropped image 708. As discussed above, there are various methodologies for subtracting out the background pixels, such as the rolling ball radius method. In an embodiment, background subtraction can be achieved by determining the mode of the histogram, which is the gray scale value that has the most pixels. In the histogram of FIG. 8A, the mode is 204. Based on this methodology, the background pixels are subtracted by identifying all pixels that have gray scale values of 204 and less, and reducing the gray scale value for each of those pixels to zero, thereby forcing those pixels to appear white in this example. This can equalize the background pixel values and can make the only remaining portion of the histogram the values for the object of interest. Therefore, the background "noise" can be substantially neutralized and the object of interest can be focused on. Also, by using the histogram in this fashion, the image of the object of interest does not get distorted or is not substantially distorted. It is still a true depiction of the image; and therefore, the underlying data that is embedded in the image is not corrupted, and the image can still be used as an assessment tool.

Figures 9A, 9B:
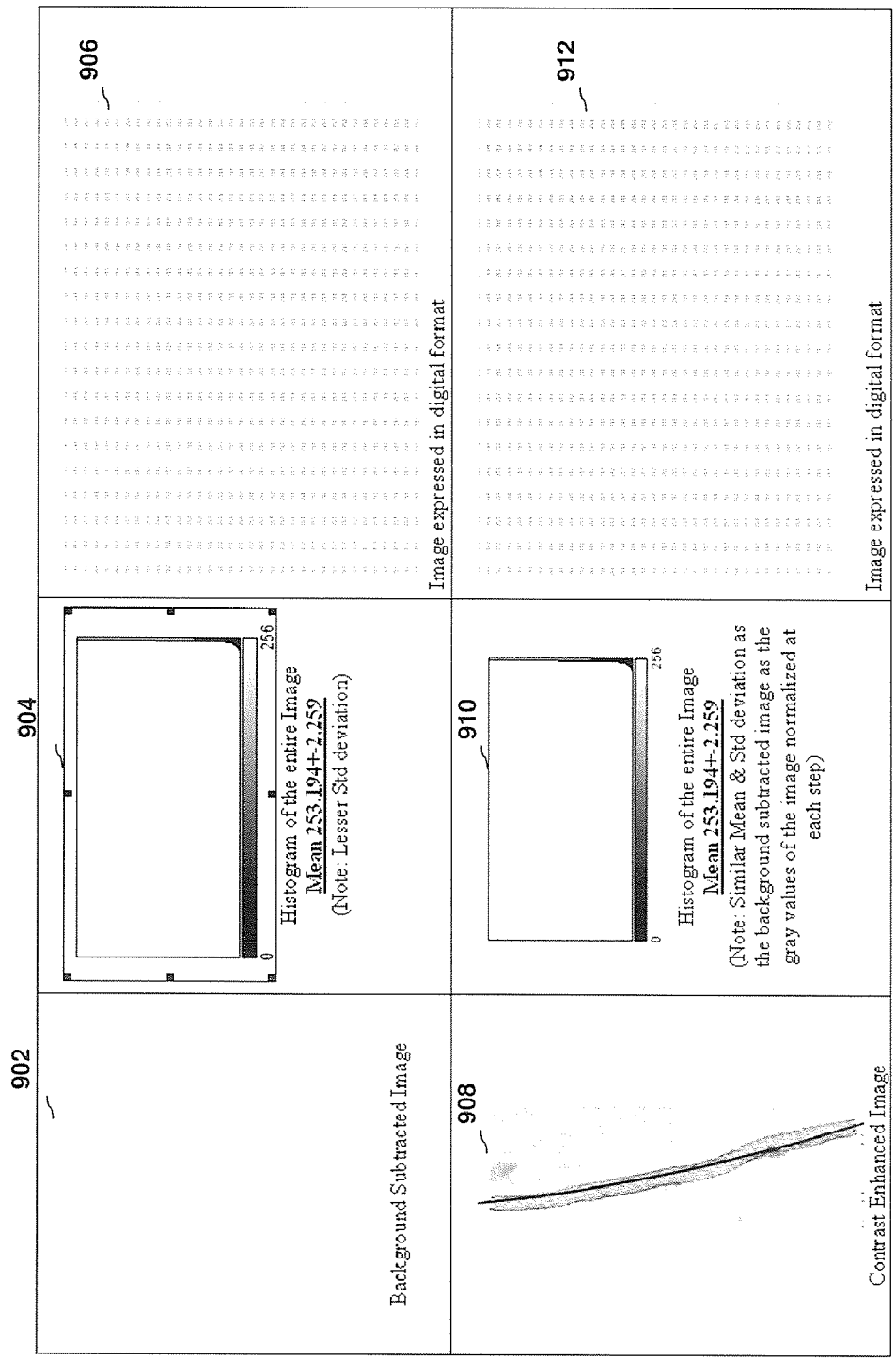
FIG. 9A depicts an example normalized image with the background substracted, a corresponding histogram, and an example depiction of the image expressed in digital format by pixel value.
FIG. 9B depicts an example image with contrast enhancement, a corresponding histogram, and an example depiction of the image expressed in digital format by pixel value.

With reference to FIG. 8B, the histogram in this process can be normalized back to a "256" scale as indicated with respect to block 410 in FIG. 4. The mode value of the background "204" is set to the "256" value which shifts the histogram in this example by "52", but keeps the relationship of the values intact. An example normalized image, with the background subtracted, is depicted in FIG. 9A, 902, along with a corresponding histogram 904 and a digital representation by pixel value 906. An advantage of this process is that now the noise of the background is filtered out while retaining the true physical relationship of the underlying image for the ROI. Meaningful automated analysis and enhancement can now be performed on the normalized image because the background noise does not skew this analysis and image enhancement. At this point, the normalized image can be used for any purpose that an end user wants to use it for. In the example depicted, the process at block 412 in FIG. 4 uses the normalized image to enhance the image. With reference to FIG. 9B, there is illustrated an example contrast enhanced image 908, a corresponding histogram 910, and a digital representation by pixel value 912. In an embodiment, the normalized digital image 902 has been enhanced by applying an intensification value across the entire image to highlight the contrast between elements. By doing the enhancement this way, the original underlying data is not distorted, and the values of the histogram remain constant relative to one another.

Figure 10:
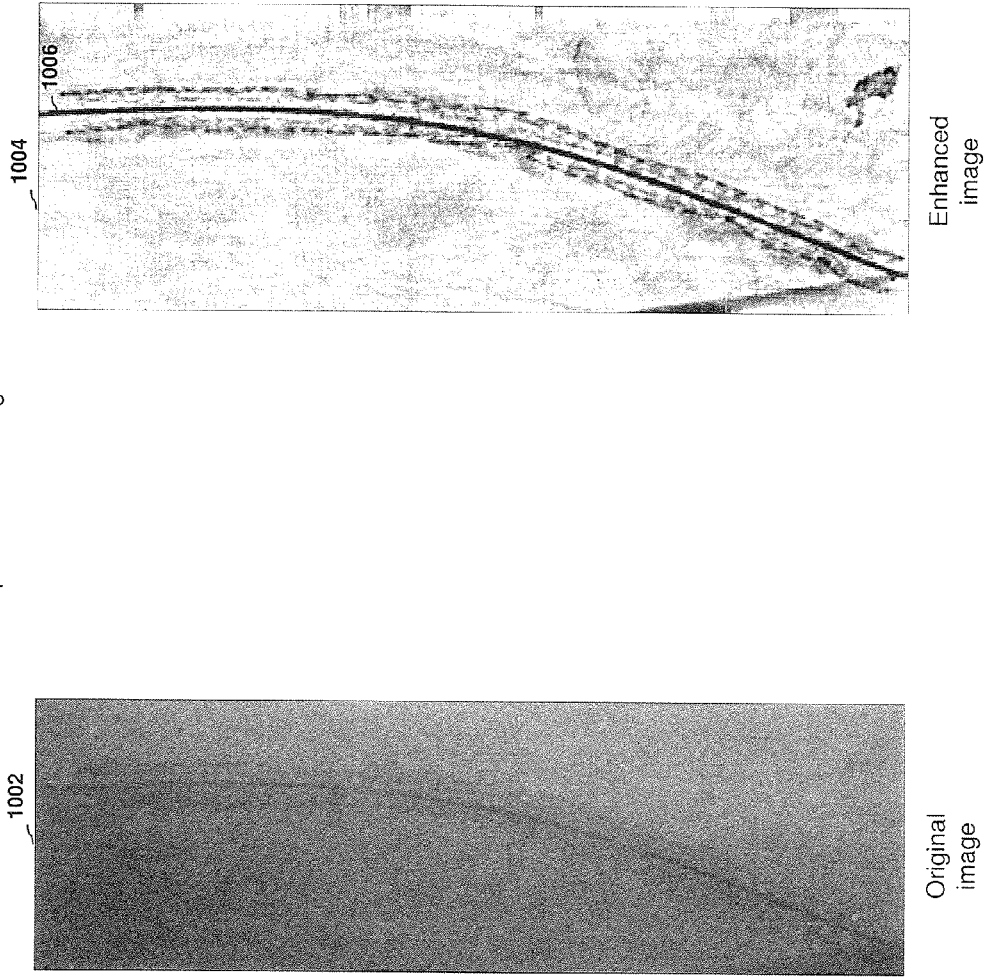
FIG. 10 depicts example images of stent elongation.

FIG. 10 depicts example images of stent elongation. The original image 1002 was processed by an embodiment of the image enhancement and analysis system 110 to produce the enhanced image 1004 using the techniques discussed above. In this example, the image enhancement and analysis system 110, using the techniques described below, determined that the entire stent was elongated substantially across its entire length. In an embodiment, the elongation of the stent is determined by using the guidewire 1006 as a known scale for measuring the length the stent because the guidewire diameter and partial length are known and can be used as a reference point in measuring the stent. Other methodologies and/or techniques are discussed below for determining stent elongation.

Figure 11:
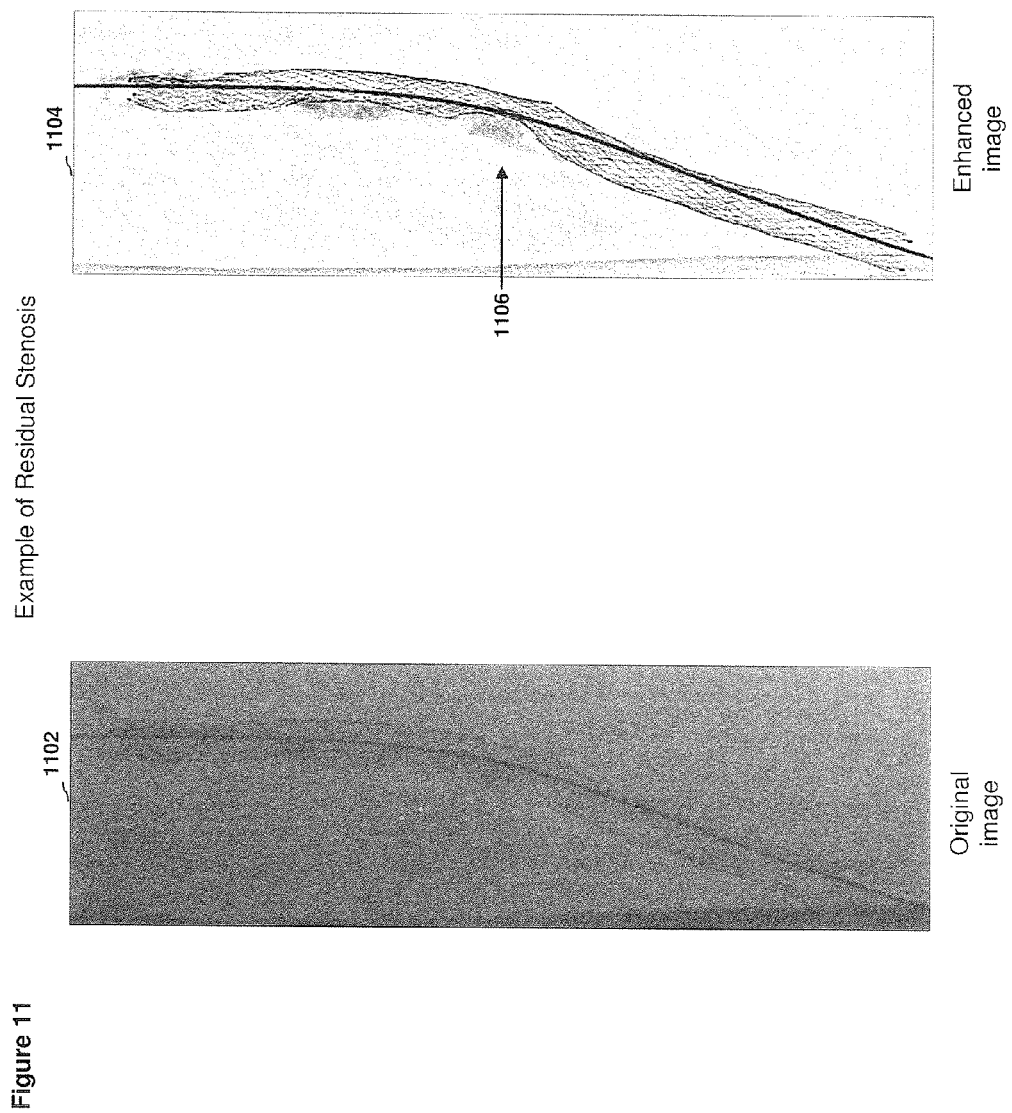
FIG. 11 depicts example images of stenosis.

With reference to FIG. 11, there are illustrated example images of stenosis. In the original image 1102, the area of stenosis 1106 cannot easily be seen; however, in the enhanced image 1104, the stenosis area 1106 is more clearly visible such that a system can more accurately measure the diameter of the stent. In an embodiment, the system is configured to identify stent struts by detecting high intensity pixel values in the image, and then measuring the distance between struts to determine the diameter of the stent. Generally oversized stents are implanted into vessels so that stents have enough outward radial force for supporting a lumen structure. To determine degree of or diameter of stenosis, the measured diameter value can be compared to a normal stent or a normal implanted stent. Using the ratio of the measured diameter value to the normal stent diameter value, the image enhancement and analysis system 110 can correlate the ratio to a database and/or lookup chart listing the known outward radial force exerted by a stent of this kind so as to infer the radial force being exerted by the vessel on the stent. Degree of or diameter of stenosis can also be determined by comparing the measured diameter to the relative diameter of the implanted stent, or the minimal lumen diameter (MLD). With this methodology, the image enhancement and analysis system measures the diameter of the stent at substantially each line profile to determine the maximum MLD, which is generally the largest measured diameter of the stent. To determine the level of stenosis of the stent/vessel, the measured diameter of the stent at a particular area is divided by the max MLD to determine the percent residual stenosis.

Figure 12:
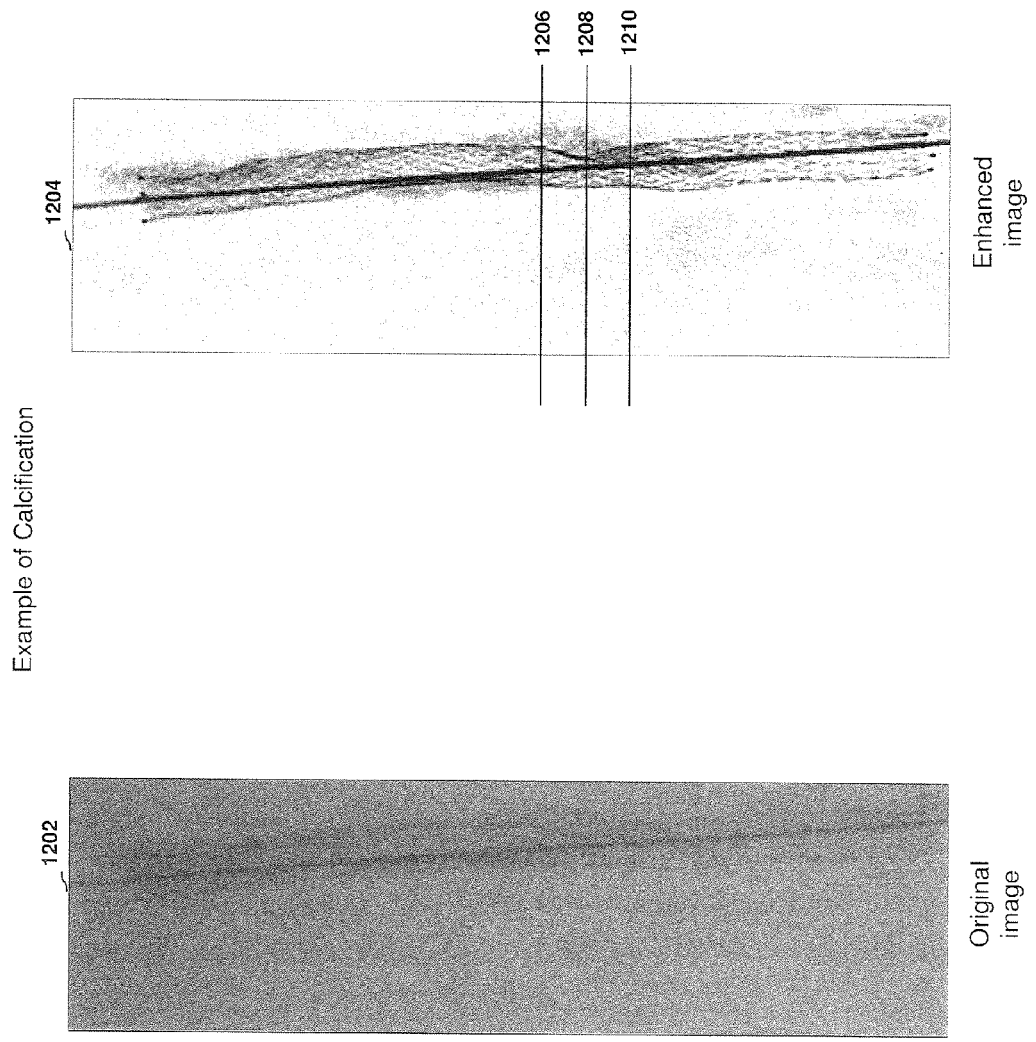
FIG. 12 depicts example images of calcification.

In reference to FIG. 12, there are illustrated example images of calcification. To determine vessel calcification, the image enhancement and analysis system 110 can be configured to perform a four criteria analysis. First the system determines whether there is a depression in the stent, for example, a localized region in the stent having reduced diameter, and whether the areas surrounding the depression have pixels with varied intensity (usually darker than surrounding pixels). To determine whether a depression exists, the system performs slope analysis of the outer boundary of the stent. For example, the system can be configured to detect changes in slope values, and can be configured to mark, demark, and/or identify the areas/points of changing slope (for example, points 1206, 1208, and 1210). Here, the system can interpret the change in slope values as indicating that a depression exists between these two points 1206, 1210. The system can be configured to perform line profile analysis to determine whether the area surrounding the depression has pixels with varied intensity (usually darker than other pixels) by evaluating the pixel intensity values.

With reference to FIG. 12, as a second criterion, the system can be configured to determine whether the included angle between the two points 1206, 1210 is less than 180 degrees, and more preferably less than 150 degrees. As a third criterion, the system can be configured to determine whether the height-width ratio is less than certain clinically relevant values. As a fourth criterion, the system can be configured to determine whether the surrounding pixel intensity levels are between measured clinically relevant pixel values. In an embodiment, the system is configured to identify vessel calcification if all four criteria are satisfied. To determine whether the measured pixel intensity value is above the above threshold values, the threshold values should be calibrated to the measured pixel intensity values. To calibrate the threshold values, the system can be configured to determine the measured pixel intensity value of the strut in the image and correlate that value to the strut pixel intensity value determined for the threshold values. Based on that correlation and cross multiplication, the threshold values can be calibrated for the image at issue. With the threshold values calibrated, the system can determine whether the measured pixel intensity values are above the calibrated threshold values. In an embodiment, the system can be configured to identify an area as exhibiting characteristics of calcification if all four of the criteria are satisfied. In other embodiments, each of the four criteria can be optional to a finding of calcification by the system.

With reference to FIGS. 13A, 13B, and 13C, there are illustrated example images depicting areas of stent radial compression and areas of stent elongation. In FIG. 13A, the image enhancement and analysis system 110 identified in the enhanced image two regions of radial compression 1302, 1304. In an embodiment, the image enhancement and analysis system 110 is configured to determine the diameter of the stent (for example, at block 236) and compare the measured diameter to a threshold values database (for example, database 242) to correlate the measured diameter to a score, category, and/or grade based on the type, size, and/or manufacture of the stent at issue. For example, an embodiment of a scoring, categorizing, typing, and/or grading system for residual stenosis is illustrated in Table 1 below, and such data can be stored in the image enhancement and analysis system 110, and can be unique with respect each kind, type, manufacture of stent.

TABLE 1

Radial Compression Grading System

| Grade | Percentage of Radial Compression |
|---|---|
| Grade 0 | No or substantially no residual stenosis detected |
| Grade I | 1%-40% |
| Grade II | 41%-100% |

As illustrated in FIG. 13A, the image enhancement and analysis system 110 categorized both regions of compression 1302, 1304 as type II. In an embodiment, the image enhancement and analysis system 110 is configured to output a recommendation to the user based on the categorization of the stent diameter. For example, if the stent is categorized as being in a type 0 or type I condition, then the image enhancement and analysis system 110 can be configured to output a recommendation to the physician to continue monitoring the stent every six months for possible further radial compression because based on clinical outcome studies and other research, it has been, in an example, determined, statistically determined, and/or clinically determined that there is a correlation between a type 0 or type I condition, and high patency/high flow. Another example is, if the stent is categorized as being in a type II condition, then the image enhancement and analysis system 110 can be configured to output a recommendation to the physician to revise, reposition, reorient, realign, redeploy, move, push, compress, alter, expand, re-insert, remove, and/or replace, and/or prepare the vessel further before placing the stent because based on clinical outcome studies and other research, it has been, in an example, determined, statistically determined, and/or clinically determined that there is a correlation between type II radial compression and vessel patency.

With reference to FIG. 13B, the image enhancement and analysis system 110 identified in the enhanced image one area of radial compression 1306, and two regions of stent elongation 1308, 1310. With respect to the stent elongation, the image enhancement and analysis system 110 can be configured to determine the length of the stent (for example, at block 234) and compare the measured length to a threshold values database (for example, database 242) to correlate the measured length to a score, category, and/or grade based on the type, size, and/or manufacture of the stent at issue. For example, an embodiment of a scoring, categorizing, typing, and/or grading system for stent elongation is illustrated in Table 2 below, and such data can be stored in the image enhancement and analysis system 110, and can be unique with respect each kind, type, manufacture of stent.

TABLE 2

Elongation Grading System

| Grade | Percentage of Elongation |
|---|---|
| Grade I | 0%-10% |
| Grade II | 11%-20% |
| Grade III | 21% or more |

As illustrated in FIG. 13B, the image enhancement and analysis system 110 categorized elongation region 1308 as type II elongation, and elongation region 1310 as type I elongation. In an embodiment, the image enhancement and analysis system 110 is configured to output a recommendation to the physician and/or user based on the categorization of the stent elongation. For example, if the stent is categorized as being in a type II or type III condition, then the image enhancement and analysis system 110 can be configured to output a recommendation to the physician to revise, reposition, reorient, realign, redeploy, move, push, compress, alter, expand, re-insert, remove, and/or replace, and/or deploy the stent correctly because based on clinical outcome studies and/or other research, it has been, in an example, determined, statistically determined, and/or clinically determined that there is a correlation between type II and type III elongation, and stent fracture. Another example is, if the stent is categorized as being in a type 0 or type I condition, then the image enhancement and analysis system 110 can be configured to output a recommendation to the physician to continue monitoring the stent every six months for possible further elongation because based on clinical outcome studies and other research, it has been, in an example, determined, statistically determined, and/or clinically determined that there is a reduced risk of stent fracture when the stent is in a type 0 or type I condition.

Figures similar to FIGS. 13A, 13B, and 13C can be used to demonstrate stent overlap. Stent overlap can occur in instances where a physician deploys multiple stents in an area, and the stents overlap each other. In an embodiment, the image enhancement and analysis system 110 can be configured to determine the length of the stent overlap (for example, at block 238) and compare the measured overlap length to a threshold values database (for example, database 242) to correlate the measured overlap length to a score, category, and/or grade based on the type, size, and/or manufacture of the stent at issue. For example, an embodiment of a scoring, categorizing, typing, and/or grading system for stent overlap is illustrated in Table 3 below, and such data can be stored in the image enhancement and analysis system 110, and can be unique with respect each kind, type, manufacture of stent.

TABLE 3

Stent Overlap Grading System

| Grade | Percentage of Stent Overlap |
|---|---|
| Grade 0 | 0%-3% |
| Grade I | 4% or more |

Table 3, as well as the other similar tables disclosed herein is an example of grading systems or definitions related to various characteristics of a device, such as a stent, and that other values and/or threshold values can be used, and/or can be specific to devices. For example, the percentage of stent overlap ranges can be as follows: Grade 0=0%-4%; Grade I=4.1% or more. In other embodiments, the threshold value ranges for stent overlap from Grade 0 can range from 0 mm-5 mm, and for Grade I the threshold value ranges for stent overlap from 1 mm-20 mm. In an embodiment, for a particular stent, Grade 0=0 mm-3 mm, and Grade I=greater than 3 mm.

Similar to FIGS. 13A, 13B, and 13C, the image enhancement and analysis system 110 can identify stent overlap by identifying the stent tip markers of one stent and measure the distance between the stent tip markers of a second stent that is overlapping the first stent. The image enhancement system can be configured to determine the total length of the first and/or second stent. To determine the percentage of stent overlap, the image enhancement system divides the measured overlap length by either the total length of the first/second stent or the average of the first and second stent total length.

As discussed with FIGS. 13A and 13B, the image enhancement and analysis system 110 can be configured to categorize the measured overlap length as either type 0 or type I. In an embodiment, the image enhancement and analysis system 110 is configured to output a recommendation to the physician and/or user based on the categorization of the stent overlap. For example, if the stent is categorized as being in a type I condition, then the image enhancement and analysis system 110 can be configured to output a recommendation to the physician to revise, reposition, reorient, realign, redeploy, move, push, compress, alter, expand, re-insert, remove, and/or replace, and/or prevent too much overlapping, the stents because based on clinical outcome studies and other research, it has been, in an example, determined, statistically determined, and/or clinically determined that there is a correlation between type I stent overlap, and stent fracture. Another example is, if the stent is categorized as being in a type 0 condition, then the image enhancement and analysis system 110 can be configured to output a recommendation to the physician to continue monitoring the stent every six months for possible stent fracture because based on clinical outcome studies and other research, there appears to be a correlation between a reduced risk of stent fracture and a type 0 condition.

Figure 14B:
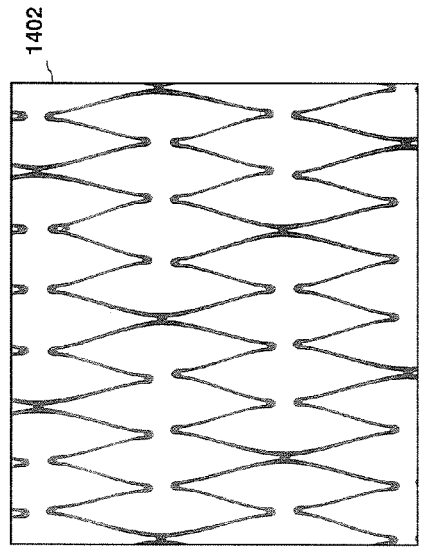
FIG. 14B depicts a magnified view of the example stent.
Figure 14C:
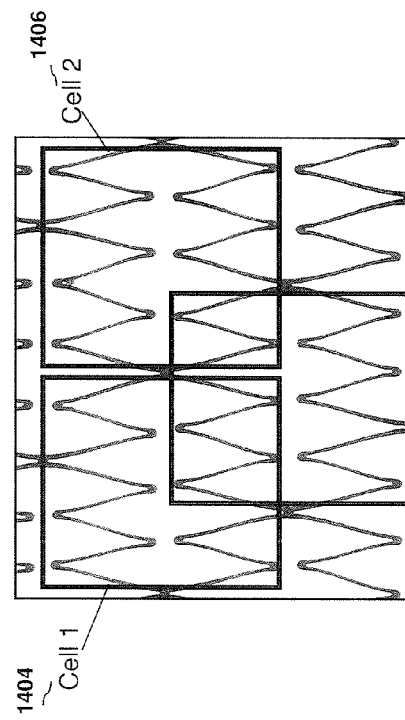
FIG. 14C is the example magnified view of the example stent highlighting example cells of the stent.
Figure 14A:
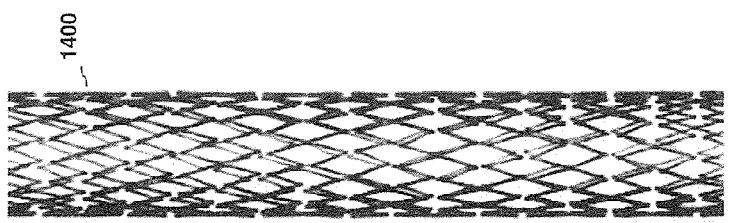
FIG. 14A depicts an example normal stent.

In reference to FIG. 14A, an example normal stent 1400 is illustrated, and FIG. 14B depicts a magnified view 1402 of the example stent. Stents are widely used for supporting a lumen structure in a patient's body. For example, stents may be used to maintain patency (flow) of a coronary artery, carotid artery, cerebral artery, popliteal artery, iliac artery, femoral artery, tibial artery, other blood vessels including veins, or other body lumens such as the ureter, urethra, bronchus, esophagus, or other passage. Stents are commonly metallic tubular structures made from stainless steel, Nitinol, Elgiloy, cobalt chrome alloys, tantalum, and other metals, although polymer stents are known. Stents can be permanent enduring implants, or can be bioabsorbable at least in part. Bioabsorbable stents can be polymeric, bio-polymeric, ceramic, bio-ceramic, or metallic, and may elute over time substances such as drugs. Non-bioabsorbable stents may also release drugs over time. Stents are passed through a body lumen in a collapsed state. At the point of an obstruction or other deployment site in the body lumen, the stent is expanded to an expanded diameter to support the lumen at the deployment site.

With reference to FIG. 14A, certain stents designs are open-celled or close-celled cylindrical structures that are expanded by inflatable balloons at the deployment site. This type of stent is often referred to as a "balloon expandable" stent. Stent delivery systems for balloon expandable stents are typically comprised of an inflatable balloon mounted on a multi lumen tube. The stent delivery system with stent crimped thereon can be advanced to a treatment site over a guidewire, and the balloon inflated to expand and deploy the stent. Other stents are so-called "self expanding" stents and do not use balloons to cause the expansion of the stent. An example of a self-expanding stent is a tube (for example, a coil tube, a mesh tube, or an open-celled tube) made of an elastically deformable material (for example, a superelastic material such a Nitinol). This type of stent is secured to a stent delivery device under tension in a collapsed state. At the deployment site, the stent is released so that internal tension within the stent causes the stent to self-expand to its enlarged diameter. Other self-expanding stents are made of so-called shape-memory metals. Such shape-memory stents experience a phase change at the elevated temperature of the human body. The phase change results in expansion from a collapsed state to an enlarged state. A very popular type of self expanding stent is an open-celled tube made from superelastic Nitinol, for example, the Protege GPS stent from ev3, Inc. of Plymouth, Minn. Another stent design is disclosed in U.S. Patent Publication No. 20070289677, titled IMPLANT HAVING HIGH FATIGUE RESISTANCE, DELIVERY SYSTEM, AND METHOD OF USE, filed Jun. 18, 2007, which hereby incorporated by reference in its entirety, including specifically but not limited to the embodiments related to implants having high fatigue resistance. With reference to FIG. 14C is the example magnified view 1402 of the example stent 1400 highlighting example cells 1404, 1406, 1408 of the stent. In general stents can be constructed of cells have double helical spiral pattern.

As discussed above, there are other methods and techniques for determining stent elongation as will now be discussed in reference to FIG. 15. In an embodiment, stent elongation can be determined by template matching, wherein the image enhancement and analysis system 110 is configured to perform a pixel line by pixel line analysis of the image and compare it to a corresponding pixel line in an image of a normal stent. If the pixel lines match, then the image enhancement and analysis system 110 can determine that the stent at issue does not exhibit stent elongation; otherwise the stent does exhibit stent elongation. Alternatively, the image enhancement and analysis system 110 need not be configured to match every pixel line in order to speed up the processing and analysis.

Figure 15:
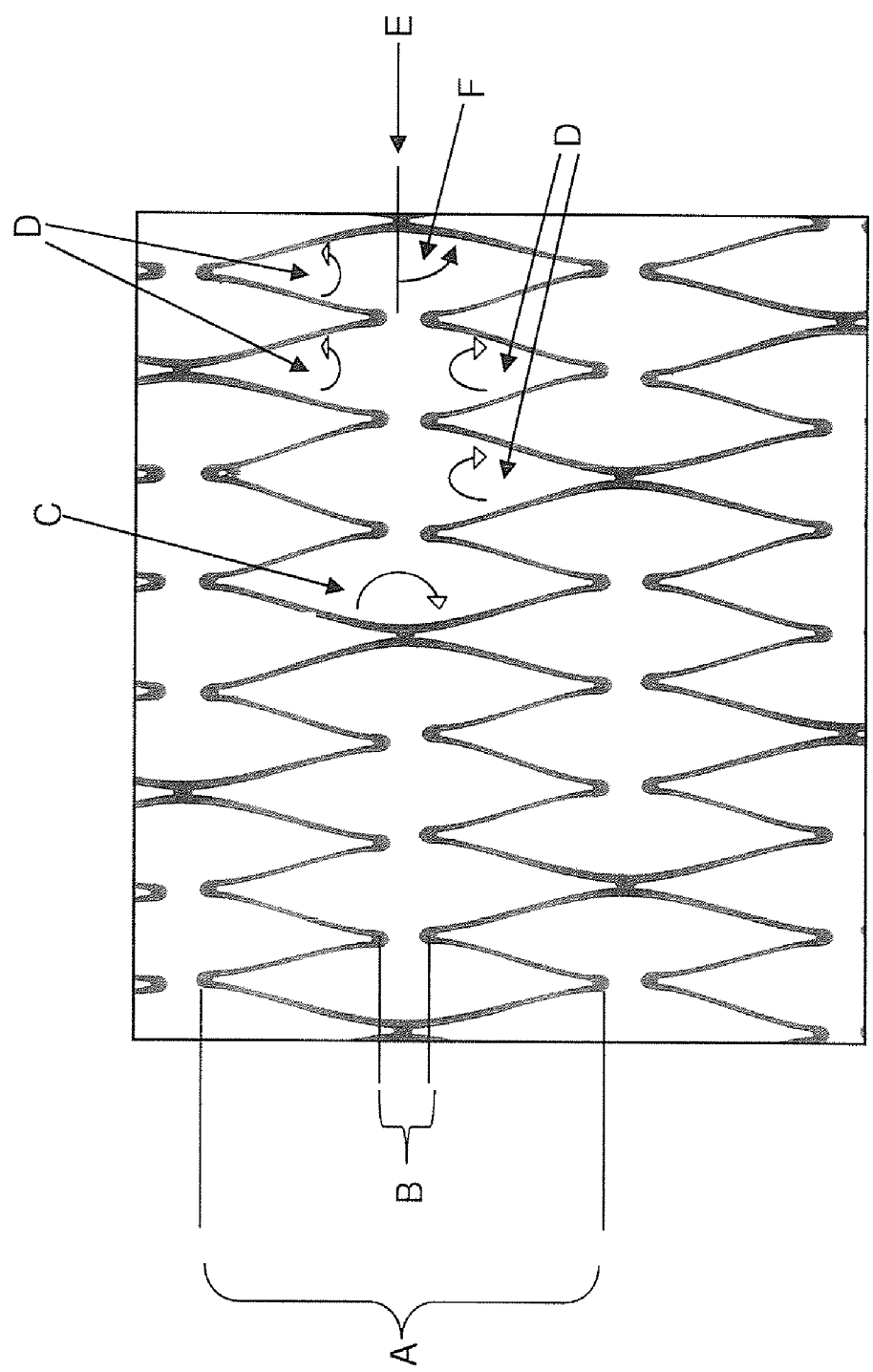
FIG. 15 depicts example distances and angles in a magnified view of an example stent.

With reference to FIG. 15, there is illustrated a magnified view of the example stent, and the example distances and angles that the image enhancement and analysis system 110 can be configured to measure to determine stent elongation. For example, the image enhancement and analysis system 110 at block 234 can be configured to measure length A between a vertex of a peak in the top portion of a cell and a vertex of a valley in the bottom portion of the same cell. In an embodiment, the image enhancement and analysis system 110 at block 234 is configured to measure the length B between a vertex of a valley in the top portion of a cell and a vertex of a peak in the bottom portion of the same cell where the changes in length B can generally be more pronounced than the changes in length A. The image enhancement and analysis system 110 at block 240 can be configured to compare the measured lengths A and/or B to threshold values stored in database 242, and based on the comparison the image enhancement and analysis system 110 can be configured to categorize the elongation and/or determine a recommendation to output to the physician and/or user.

With reference to FIG. 15, the image enhancement and analysis system 110 at block 234 can be configured to measure angles C, D, and F in the vertexes of peaks and valleys in a cell, and the angles near the cell interconnection areas. The image enhancement and analysis system 110 can be configured to measure a single angle D, or determine the average for a plurality of angle D's. In an embodiment, example Table 4 below correlates the measured angle D values to percent elongation of the stent, and the image enhancement and analysis system 110 can be configured to store such data, and such data can be unique with respect each kind, type, manufacture of stent.

TABLE 4

Measure Angle D Correlations to Percent Elongation

| Angle Measurement of Angle D | Percent Elongation of Stent |
|---|---|
| 30°-40° | Normal |
| 26°-29° | ~10%-15% |
| 22°-25° | ~15%-30% |
| 18°-21° | ~30%-50% |

In reference to FIG. 15, in an embodiment, the image enhancement and analysis system 110 at block 234 can be configured to measure the angle C and/or F where the changes in degrees are generally more pronounced in angles C and/or F than in angles D. In an embodiment, example Table 5 below correlates the measured angle F values to percent elongation of the stent, and the image enhancement and analysis system 110 can be configured to store such data.

TABLE 5

Measure Angle D Correlations to Percent Elongation

| Angle Measurement of Angle F | Percent Elongation of Stent |
|---|---|
| 30°-49° | ~10% |
| 50°-59° | ~20% |
| 60°-69° | ~30% |
| 70°-79° | ~40% |
| 80°-90° | ~50% |

With reference to FIG. 15, the image enhancement and analysis system 110 at block 240 can be configured to compare the measured angles to threshold values stored in database 242, and based on the comparison the image enhancement and analysis system 110 can be configured to categorize the elongation and/or determine a recommendation to output to the physician and/or user. One of ordinary skill the art will appreciate the methods and techniques for measuring angles C, D, and F. For example, the image enhancement and analysis system 110 can be configured to use a Hough transform analysis to find the best fit line (vector) a stent strut to be measured, and generating/identifying a known vector E, and by taking the dot product of both vectors, the image enhancement analysis system 110 can generate (automatically or semi-automatically) measurement of the angle F.

Figure 16A:
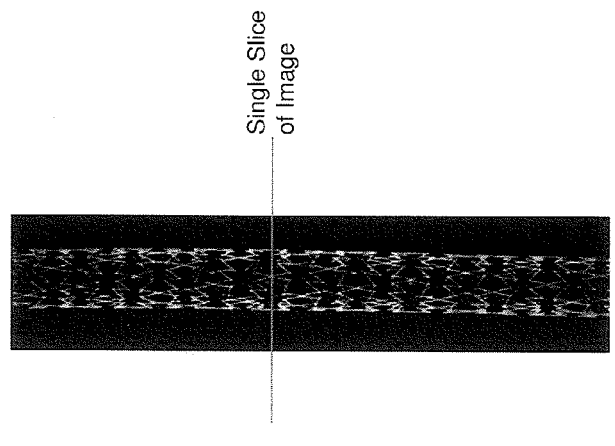
FIG. 16A depicts an example normal stent.
Figure 16B:
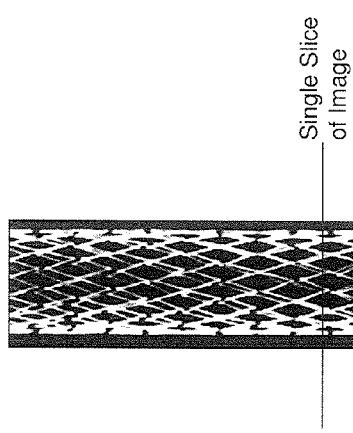
FIG. 16B depicts an example implanted stent.
Figure 16C:
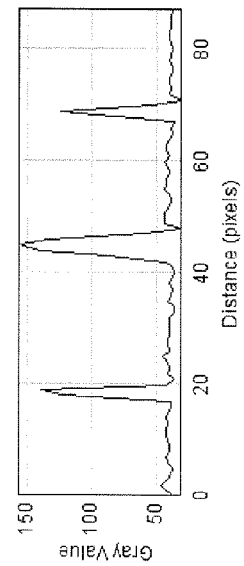
FIG. 16C depicts a corresponding example single slice profile of the normal stent.
Figure 16D:
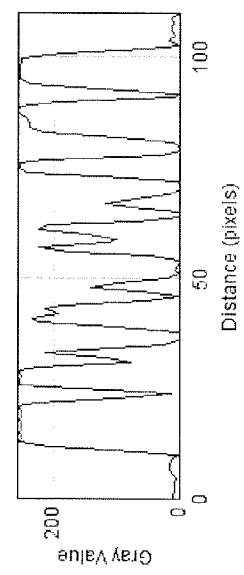
FIG. 16D depicts a corresponding example single slice profile of the implanted stent.

With reference to FIG. 16A, there is depicted an example normal stent, and in FIG. 16C there is depicted a corresponding example single slice profile of the normal stent. FIG. 16B depicts an example implanted stent, and FIG. 16D depicts a corresponding example single slice profile of the implanted stent. In this example, an image is first obtained as indicated at block 404 (FIG. 4). The image is then enhanced as indicated at blocks 406, 408, 410, 412, and 414 (optional). In this example, referring now to FIGS. 16A and 16B, the process then does a raster scan of the entire image as the image is generally expressed in digital intensity values. FIGS. 16C and 16D show the raster scan respectively for FIGS. 16A and 16B. Once the profile of a slice is obtained, the process then identifies the regions where the stent lies to determine metal coverage of the line profile. Generally there are number of peaks lower/higher in magnitude in a certain area. In an embodiment, the peaks indicate the regions where a stent strut exists.

With reference FIGS. 16A, 16B, 16C, and 16D, the process then selects three distinct peaks, generally the edges and the center. Using these peaks as a source of reference, the process calculates the Euclidean distance between these high intensity peaks as the x and y co-ordinate of these peaks are known. Finally, the process normalizes this distance to match the template of the original stent. The differences in slice profiles of normal stents as compared to the elongated stent are shown in FIGS. 16C and 16D respectively to elucidate the differences and help categorize the elongation of the device better. In an embodiment, the enhancement and analysis system 110 can be configured to determine the metal coverage of the line profile, and if the metal coverage of the line profile is below a threshold value, then the enhancement and analysis system 110 can be configured to output a recommendation to the physician and/or user to remove the stent. Alternatively, each single slice profile can act like a signature for the stent, and the image enhancement and analysis system 110 can be configured to compare and best match a signature of a stent at issue with the signatures of known stents (stored in threshold database 242, for example). In determining a match or best fit match, the image enhancement and analysis system 110 can extrapolate stent elongation for the stent at issue based on known characteristics of the known stent.

Figure 17B:
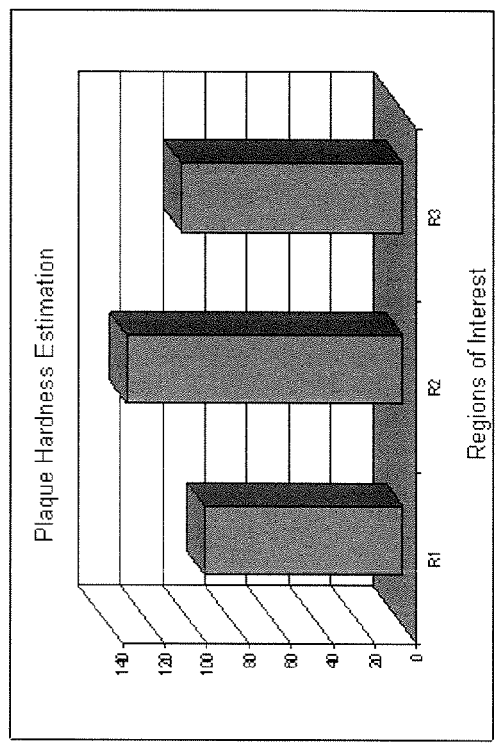
FIG. 17B depicts an example representation of plaque hardness estimations for the example regions of interest depicted in FIG. 17A.
Figure 17A:
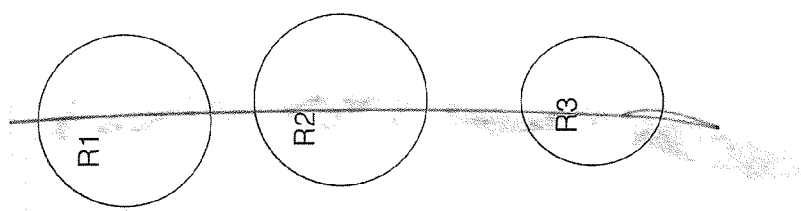
FIG. 17A depicts an image of a stent having example regions of interest.

FIG. 17A depicts an example image of a stent having example regions of interest, and FIG. 17B depicts an example representation of plaque hardness estimations for the example regions of interest depicted in FIG. 17A. In this example, an image is first obtained as indicated at block 404. The image is then enhanced as indicated at blocks 406, 408, 410, 412, and 414 (optional). In this example, referring now to FIG. 17A, the process then measures the pixel intensity of the guidewire or any other calibration object, and the pixel intensity of the areas around the object of interest at different regions R1, R2, R3 along the length of the object, and plots the histogram to measure the mean pixel intensity value and the standard deviation.

The system can then calculate the relative intensity of the calcified regions with respect to the intensity of the calibration object, the guidewire in this case, as shown in FIG. 17B. FIG. 17B indicates that R1 may have relatively less or softer calcification as compared to regions R2 and R3 when calibrated with the pixel intensity of the guidewire.

Figure 18B:
FIG. 18B is an example image depicting contrast flow after stenting or during atherectomy.
Figure 18A:
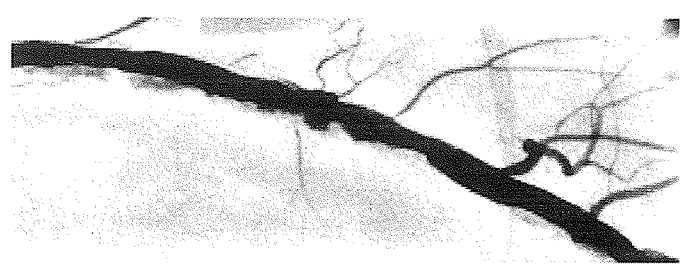
FIG. 18A is an example image depicting contrast flow before stenting.

With reference to FIG. 18A, there is illustrated an example image depicting contrast flow before stenting, and in reference to FIG. 18B, there is illustrated an example image depicting contrast flow after stenting or during atherectomy. In this example, cines of contrast injections in the vessel before and after treatment are obtained at block 404 (FIG. 4). The process then enhances the cine of the angiographic contrast injection as indicated at blocks 406, 408, 410, 412, and 414 (optional). In this example, referring now to FIGS. 18A and 18B, the process selects ROI's at the input and output of the vessel for both before and after treatment cines. The process then calculates time density curves (TDC's) for each region as the injected contrast passes through the region, and then calculates discrete Fourier transforms for each TDC. The process then calculates the Transfer function by dividing output waveform by input waveform in frequency space, and then takes an inverse Fourier transform for both cines before and after treatment. The process then integrates the final transfer function for both cines before and after treatment and performs a relative comparison to provide a quantitative parameter indicating the difference in flow waveform after treatment. The difference in contrast flow TDC between unstented and stented vessels in this example, shown in FIGS. 18A and 18B, after calculation is 6%.

Figure 19:
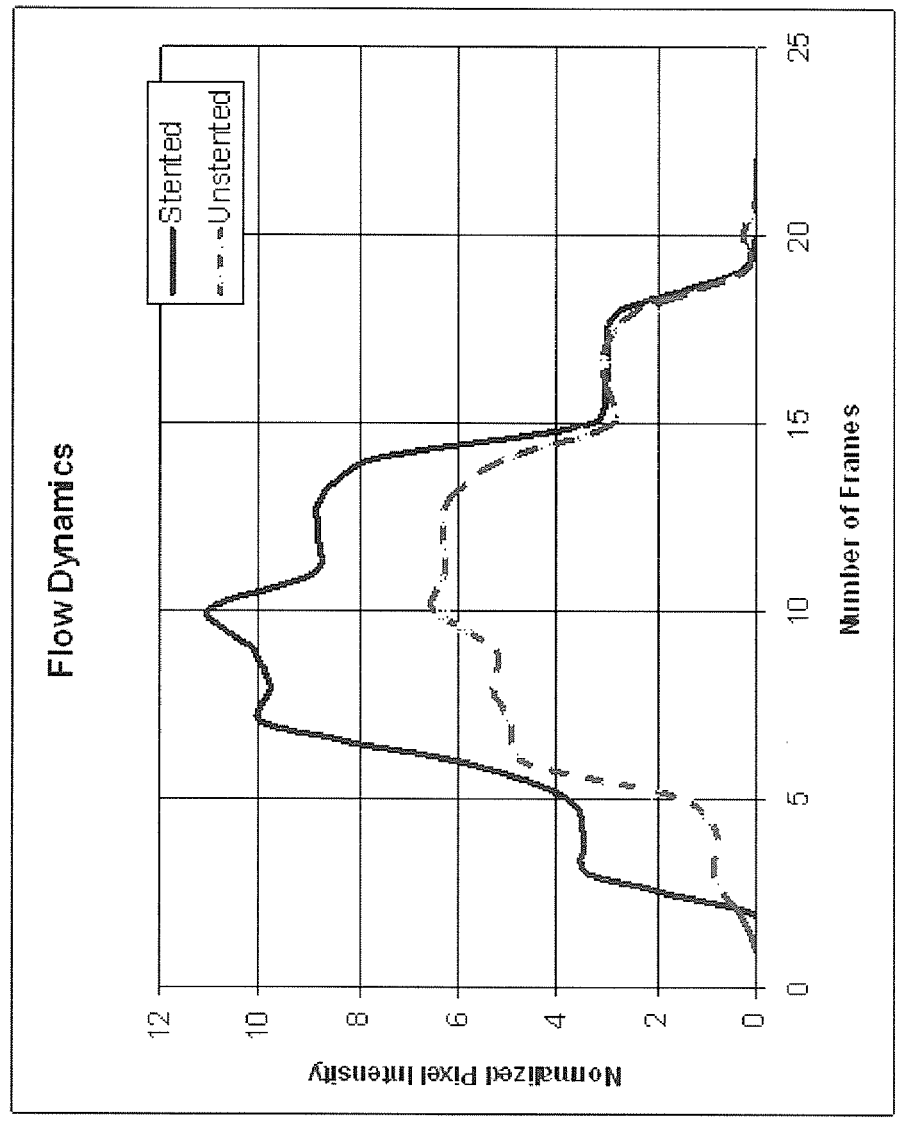
FIG. 19 is an example chart depicting flow dynamics of a vessel that is stented versus unstented.

With reference to FIG. 19, there is illustrated an example chart depicting flow dynamics of a vessel that is stented versus unstented. In an embodiment, the image enhancement and analysis system 110 can be configured to determine flow rate and/or patency through a vessel by measuring at different time intervals the pixel intensity in a vessel injected with a bolus of radiopaque and/or other dye, and the measured pixel intensity values (y-axis) can be plotted against time (x-axis) as illustrated in FIG. 19. In an embodiment, the measured pixel values are normalized because in some instances the injected quantities and/or rates of radiopaque and/or other dye into the vessel is not the same. To normalize the pixel values, the total mass flow rate is measured at a position along the vessel (for example, the top portion of the vessel), and the image enhancement and analysis system 110 can be configured to divide each measured pixel value by the total mass flow rate to normalize the pixel value. In an embodiment, the image enhancement and analysis system 110 can be configured to integrate the curves to determine the areas under the stented vessel curve and the unstented vessel curve. The image enhancement and analysis system 110 can then determine the percent change between the two areas, and this percent change can then be correlated to determined threshold values to determine whether the stenting procedure was successful or not, for example, successful in increasing blood flow through the vessel. Along the same lines one can also develop metrics from the waveform like washout rate, input rate, and peak intensity to help analyze the factors on which a clinical outcome would depend upon.

Figure 20:
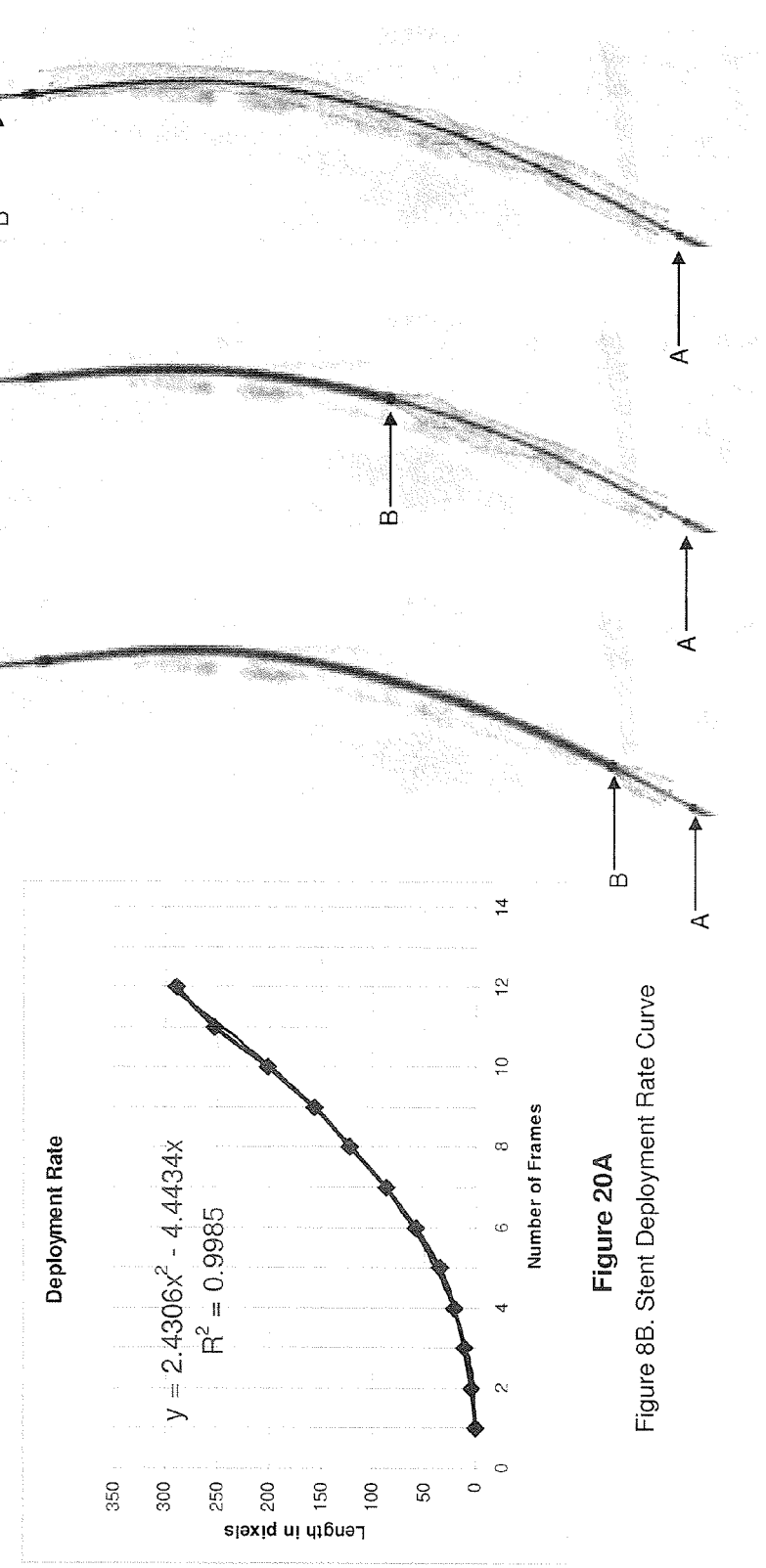
FIG. 20A is an example chart depicting deployment rate of a stent.
FIG. 20B is a corresponding series of example images of a stent deployment.

FIG. 20A is an example chart depicting the deployment rate of a stent, and FIG. 20B is a corresponding series of example images of a stent deployment. In this example, x-ray cine is first obtained. The cine sequence is then enhanced as indicated at blocks 404, 406, 408, 410, 412, and 414 (optional). In an embodiment, a delivery catheter inner tube tip marker A and an delivery system outside sheath tip marker B are calibrated to a given intensity, and a motion tracking algorithm is used to follow the motion of marker B, and determine the distance between marker A and marker B for the images in the sequence. Generally, the inner tube tip and the tip of the sheath have band markers with characteristics, such as X-ray absorbance, to cause a significant pixel intensity difference on the image, making it relatively easy after image enhancement for motion tracking of the markers from the surrounding image background. Some of the images of the withdrawal of the outside sheath are shown in FIG. 20B and the corresponding deployment rate curve is shown in FIG. 20A. In certain embodiments, the system can be configured to provide to the user/physician real-time or substantially real-time feedback as to whether to speed up or slow down deployment of the stent. In certain embodiments, if the stent is deployed too slowly or too fast, then stent elongation, fracture, and other adverse affects can occur. Additionally, by deploying the stent at an optimal speed, the physician can minimize radiation exposure of the patient undergoing the procedure because the fewer x-ray images that need be obtained the faster the procedures proceeds. In general, it may be preferable to deploy the stent slowly at the beginning of the deployment, then more quickly during the middle of the deployment, and then more slowly at the end of the deployment.

Figure 21:
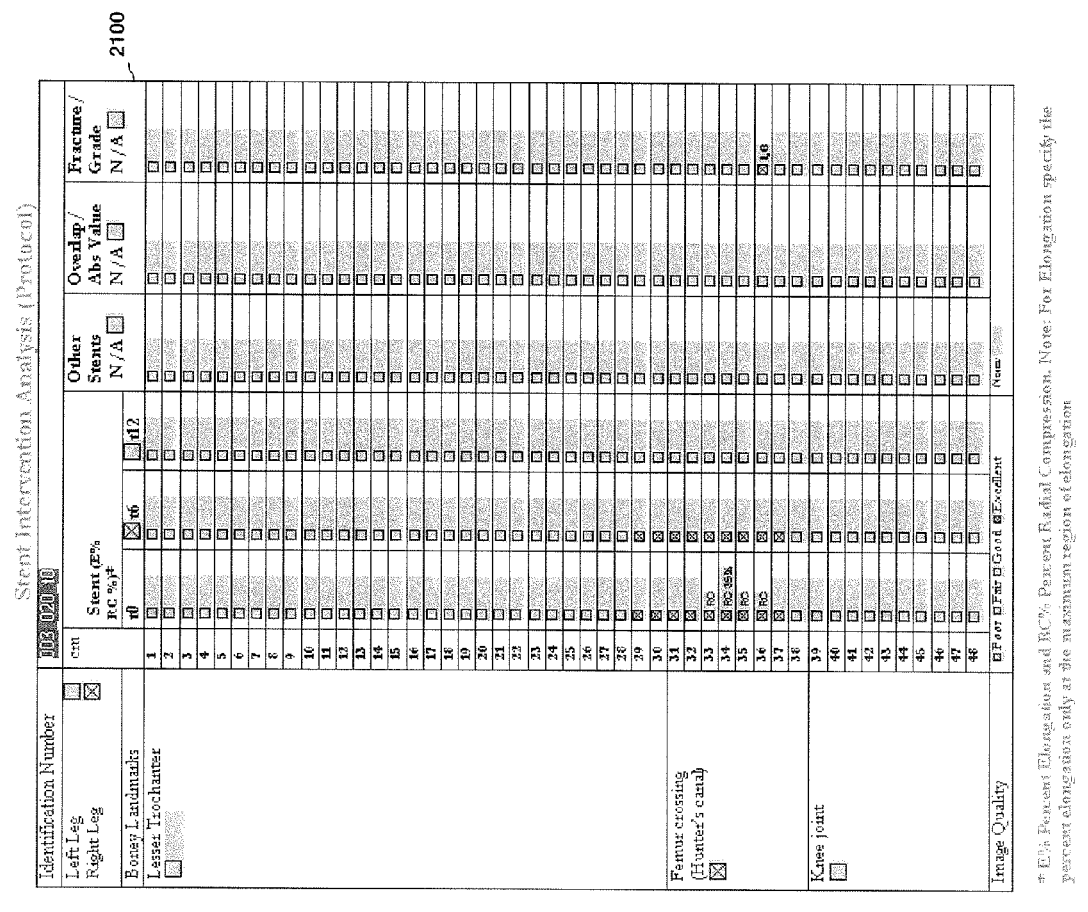

FIG. 21 is an example form 2100 used for generating and/or collecting clinical data. In an embodiment, the computer system can be configured to automatically use and/or populate and/or input data into the form, and in an embodiment, the form can be completed by a user or physician, and/or the form/data can be upload/inputted into the system. Researchers, scientists, physicians, and other users can use the example form 2100 in reviewing images to correlate clinical outcomes associated with certain features, characteristics, measurements, distances, and the like observed in enhanced images produced by the image enhancement and analysis system 110. For example, in reviewing images having a stent, each centimeter of the stent can be reviewed, and an appropriate box can be checked or an entry can be made for each centimeter position along the length of the stent. For example, in the form 2100 at centimeter marks 33, 34, 35, and 36 the user of the form noted that there existed radial compression of the stent. Further, at centimeter mark 36 there was a fracture. Such data from the form 2100 can then be stored in a database, for example, master database 138, whereon data mining could be performed to determine threshold values that are predictive of stent elongation, fractures, or any other adverse or undesirable condition of a stent.

Computing System

Figure 22:
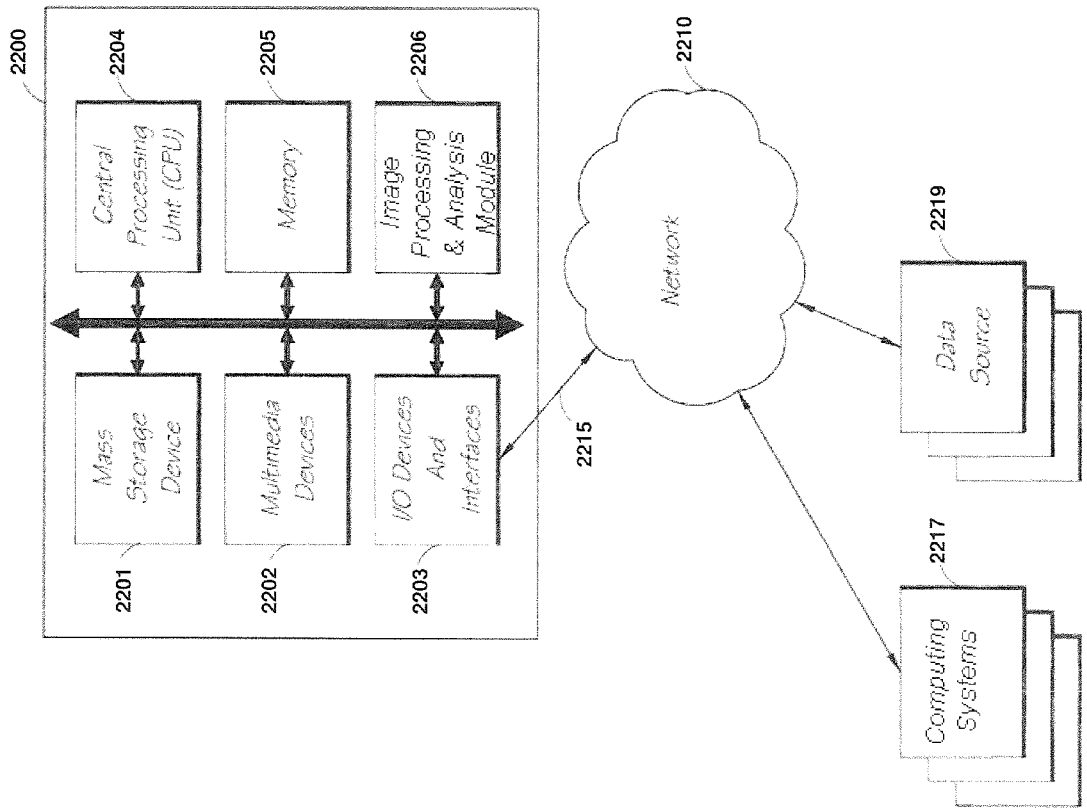
FIG. 22 is a block diagram depicting one embodiment of a computer hardware system configured to run software for implementing one or more embodiments of the image enhancement and analysis system described herein.

In some embodiments, the systems, computer clients and/or servers described above take the form of a computing system 2200 shown in FIG. 22, which is a block diagram of one embodiment of a computing system (which can be a fixed system or mobile device) that is in communication with one or more computing systems 2217 and/or one or more data sources 2219 via one or more networks 2210. The computing system 2200 may be used to implement one or more of the systems and methods described herein. In addition, in one embodiment, the computing system 2200 may be configured to process image files. While FIG. 22 illustrates one embodiment of a computing system 2200, it is recognized that the functionality provided for in the components and modules of computing system 2200 may be combined into fewer components and modules or further separated into additional components and modules.

Client/Server Module

In one embodiment, the system 2200 comprises an image processing and analysis module 2206 that carries out the functions, methods, and/or processes described herein. The image processing and analysis module 2206 may be executed on the computing system 2200 by a central processing unit 2204 discussed further below.

Computing System Components

In one embodiment, the processes, systems, and methods illustrated above may be embodied in part or in whole in software that is running on a computing device. The functionality provided for in the components and modules of the computing device may comprise one or more components and/or modules. For example, the computing device may comprise multiple central processing units (CPUs) and a mass storage device, such as may be implemented in an array of servers.

In general, the word "module," as used herein, refers to logic embodied in hardware or firmware, or to a collection of software instructions, possibly having entry and exit points, written in a programming language, such as, for example, Java, C or C++, or the like. A software module may be compiled and linked into an executable program, installed in a dynamic link library, or may be written in an interpreted programming language such as, for example, BASIC, Perl, Lua, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein can be implemented as software modules, but may be represented in hardware or firmware. Generally, the modules described herein refer to logical modules that may be combined with other modules or divided into sub-modules despite their physical organization or storage.

In one embodiment, the computing system 2200 also comprises a mainframe computer suitable for controlling and/or communicating with large databases, performing high volume transaction processing, and generating reports from large databases. The computing system 2200 also comprises a central processing unit ("CPU") 2204, which may comprise a conventional microprocessor. The computing system 2200 further comprises a memory 2205, such as random access memory ("RAM") for temporary storage of information and/or a read only memory ("ROM") for permanent storage of information, and a mass storage device 2201, such as a hard drive, diskette, or optical media storage device. Typically, the modules of the computing system 2200 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The exemplary computing system 2200 comprises one or more commonly available input/output (I/O) devices and interfaces 2203, such as a keyboard, mouse, touchpad, and printer. In one embodiment, the I/O devices and interfaces 2203 comprise one or more display devices, such as a monitor, that allows the visual presentation of data to a user. More particularly, a display device provides for the presentation of GUIs, application software data, and multimedia presentations, for example. In the embodiment of FIG. 22, the I/O devices and interfaces 2203 also provide a communications interface to various external devices. The computing system 2200 may also comprise one or more multimedia devices 2202, such as speakers, video cards, graphics accelerators, and microphones, for example.

Computing System Device/Operating System

The computing system 2200 may run on a variety of computing devices, such as, for example, a server, a Windows server, an Structure Query Language server, a Unix server, a personal computer, a mainframe computer, a laptop computer, a cell phone, a personal digital assistant, a kiosk, an audio player, and so forth. The computing system 2200 is generally controlled and coordinated by operating system software, such as z/OS, Windows 95, Windows 98, Windows NT, Windows 2000, Windows XP, Windows Vista, Linux, BSD, SunOS, Solaris, or other compatible operating systems. In Macintosh systems, the operating system may be any available operating system, such as MAC OS X. In other embodiments, the computing system 2200 may be controlled by a proprietary operating system. Conventional operating systems control and schedule computer processes for execution, perform memory management, provide file system, networking, and I/O services, and provide a user interface, such as a graphical user interface ("GUI"), among other things.

Network

In the embodiment of FIG. 22, the computing system 2200 is coupled to a network 2210, such as a LAN, WAN, or the Internet, for example, via a wired, wireless, or combination of wired and wireless, communication link 2215. The network 2210 communicates with various computing devices and/or other electronic devices via wired or wireless communication links. In the exemplary embodiment of FIG. 22, the network 2210 is communicating with one or more computing systems 2217 and/or one or more data sources 2219. The network may include one or more of internet connections, secure peer-to-peer connections, secure socket layer (SSL) connections over the internet, virtual private network (VPN) connections over the internet, or other secure connections over the internet, private network connections, dedicated network connections (for example, ISDN, T1, or the like), wireless or cellular connections, or the like or any combination of the foregoing.

Access to the image processing and analysis module 2206 of the computer system 2200 by computing systems 2217 and/or by data sources 2219 may be through a web-enabled user access point such as the computing systems' 2217 or data source's 2219 personal computer, cellular phone, laptop, or other device capable of connecting to the network 2210. Such a device may have a browser module is implemented as a module that uses text, graphics, audio, video, and other media to present data and to allow interaction with data via the network 2210.

The browser module or other output module may be implemented as a combination of an all points addressable display such as a cathode-ray tube (CRT), a liquid crystal display (LCD), a plasma display, or other types and/or combinations of displays. In addition, the browser module or other output module may be implemented to communicate with input devices 2203 and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module or other output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the system 2200 may comprise a physical or logical connection established between a remote microprocessor and a mainframe host computer for the express purpose of uploading, downloading, or viewing interactive data and databases on-line in real time. The remote microprocessor may be operated by an entity operating the computer system 2200, including the client server systems or the main server system, an/or may be operated by one or more of the data sources 2219 and/or one or more of the computing systems. In some embodiments, terminal emulation software may be used on the microprocessor for participating in the micro-mainframe link.

In some embodiments, computing systems 2217 who are internal to an entity operating the computer system 2200 may access the image processing and analysis module 2206 internally as an application or process run by the CPU 2204.

User Access Point

In one embodiment, a user access point comprises a personal computer, a laptop computer, a cellular phone, a GPS system, a Blackberry® device, a portable computing device, a server, a computer workstation, a local area network of individual computers, an interactive kiosk, a personal digital assistant, an interactive wireless communications device, a handheld computer, an embedded computing device, or the like.

Other Systems

In addition to the systems that are illustrated in FIG. 22, the network 2210 may communicate with other data sources or other computing devices. The computing system 2200 may also comprise one or more internal and/or external data sources. In some embodiments, one or more of the data repositories and the data sources may be implemented using a relational database, such as DB2, Sybase, Oracle, CodeBase and Microsoft® SQL Server as well as other types of databases such as, for example, a flat file database, an entity-relationship database, and object-oriented database, and/or a record-based database.

All of the methods and processes described above may be embodied in, and fully automated via, software code modules executed by one or more general purpose computers or processors. The code modules may be stored in any type of computer-readable medium or other computer storage device. Some or all of the methods may alternatively be embodied in specialized computer hardware.

Other Applications

By creating a normalized image, with the background noise subtracted as described above, this normalized image can used in a wide variety of analysis applications, in addition to just image enhancement. Examples of such applications comprise any image guided intervention analysis. In such situations, the process of this invention not only enhances the image, but also provides unique ways of quantifying data that have been expressed only qualitatively to date.

For example, the image enhancement and analysis system 110 can be configured to perform other stenting analyses in other situations, for example, cardiovascular, peripheral, neurovascular, renal, SMA (Superior Mesenteric Artery), gastric, SFA, popliteal, iliac, or the like. Additionally, the image enhancement and analysis system 110 can be configured to determine, analyze, and generate recommendations/reports relating to other diseased vessel conditions, such as but not limited to calcification, stenoses, vessel fragility, tortuosity, compliance, and geometry. Based on an analysis of diseased vessel conditions, the image enhancement and analysis system 110 can be configured to determine an appropriate vessel therapy that can include without limitation PTA, atherectomy, thrombectomy, stenting, and the like. Further, the image enhancement and analysis system 110 can be configured to determine, measure, evaluate, analyze other factors as listed in Table 6 in order to generate a recommendation, report, and/or provide feedback.

TABLE 6

Other Factors

| Vessel Structure | Stent Structure | Stent Durability | Additional Information |
|---|---|---|---|
| Stenosis | Fracture | Forces on stent struts | Physician deployment technique |
| Calcification (soft, hard, levels) | Elongation | | |
| | Compression | Location | |
| | | | Image resolution |
| Tortuosity | Torsion | Overall stability | |
| Dimensions | Overlap | Template matching | |
| Locations | Dimensions | Vessel compliance mismatch | Pressure waveforms |
| Compliance | Location | | |
| Patency (before) | Offsets | Pinning points (strut location with respect to plaque) | In-vivo stent behavior |
| | Migration | | Restenosis |
| | Wall apposition Patency (after) | | |

In addition to stenting analysis, the image enhancement and analysis system 110 can be configured to for use in other areas that can include without limitation:

1. CRM (Cardiac rhythm management); lead analysis
2. Orthopedics
   a. Assess body geometry
   b. Prostheses measurement
3. Emergency Medicine: Assess Fractures
4. Cosmetic Surgery
5. Forensic Investigation
6. Oncology Tumor Extent Investigation
7. Security
   a. Shape detection
8. Inspection
   a. Welding Industry
   b. Plumbing
   c. Bridge (Structural)
   d. Nuclear
   e. Oil Industry While the invention has been discussed in terms of certain embodiments, it should be appreciated that the invention is not so limited. The embodiments are explained herein by way of example, and there are numerous modifications, variations and other embodiments that may be employed that would still be within the scope of the embodiments disclosed herein.

Although the embodiments of the inventions have been disclosed in the context of certain embodiments and examples, it will be understood by those skilled in the art that the present inventions extend beyond the specifically disclosed embodiments to other alternative embodiments and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or subcombinations of the specific features and aspects of the embodiments may be made and still fall within one or more of the inventions. Accordingly, it should be understood that various features and aspects of the disclosed embodiments can be combine with or substituted for one another in order to form varying modes of the disclosed inventions. For all of the embodiments described herein the steps of the methods need not be performed sequentially. Thus, it is intended that the scope of the present inventions herein disclosed should not be limited by the particular disclosed embodiments described above.

What is claimed is:

1. A computer-implemented method for evaluating a stent in situ, the computer-implemented method comprising:
   accessing, by a processor, a computer accessible database to obtain at least one medical image;
   selecting a region of interest in the at least one medical image, wherein the region of interest comprises the stent in situ, wherein the stent comprises a plurality of cells;
   cropping the region of interest from the at least one medical image to generate a cropped image;
   identifying the background of the cropped image;
   subtracting pixels from the cropped image, wherein the subtracted pixels represent the background;
   normalizing a grayscale of the cropped image;
   adjusting contrast of the cropped image to produce a first enhanced image; and
   outputting the first enhanced image to the user.

2. The computer-implemented method of claim 1, further comprising:
   measuring intensity values of different pixels in the first enhanced image; and
   calculating a quantitative characteristic of the first enhanced image based on the measured intensity values.

3. The computer-implemented method of claim 1, further comprising:
   identifying a first vertex of a first cell in the stent within the first enhanced image;
   identifying a second vertex of the first cell in the stent within the first enhanced image;

determining a distance between the first and the second vertexes, wherein the distance is correlated to stent elongation;

accessing a computer accessible index to determine whether the distance exceeds a threshold value for stent elongation; and outputting a recommendation to the user related to the stent if the distance exceeds the threshold value.

4. The computer-implemented method of claim 1, further comprising:

identifying an angle formed within a cell in the stent within the first enhanced image;

determining a number of degrees in the angle;

accessing a computer accessible index to determine whether the number of degrees exceeds a threshold value for stent elongation; and outputting a recommendation to the user related to the stent if the number of degrees exceeds the threshold value.

5. The computer-implemented method of claim 1, further comprising:

analyzing a line profile of the first enhanced image, wherein the line profile is taken across the width of the stent;

determining the metal coverage of the line profile;

accessing a computer accessible index to determine whether the metal coverage is below a threshold value correlated to a stent characteristic; and outputting a recommendation to the user related to the stent if the metal coverage is below the threshold value.

6. The computer-implemented method of claim 1, further comprising:

accessing the computer accessible database to obtain a second medical image, wherein the second medical image comprises an image of the stent in situ at a different time;

processing the second medical image to produce a second enhanced medical image;

determining one or more disparities between the second enhanced medical image and the first enhanced image;

accessing a computer accessible index to determine whether the one or more disparities exceed a threshold value; and outputting to the user a recommendation related to the stent if the one or more disparities exceed the threshold value.

7. A computer-implemented method for evaluating a medical image, comprising:

obtaining a medical image of a desired location within a patient;

measuring pixel intensity at one or more regions of interest of the medical image; and calculating, by a processor, a quantitative characteristic of the desired location based on the measured pixel intensity.

8. The computer implemented-method of claim 7, further comprising:

selecting a region of interest in the medical image;

cropping the region of interest from the medical image to generate a cropped image;

identifying the background of the cropped image;

subtracting pixels from the cropped image, wherein the subtracted pixels represent the background;

normalizing a grayscale of the cropped image; and adjusting contrast of the cropped image to produce a first enhanced image, wherein the measuring pixel intensity at one or more regions of interest is performed in the first enhanced image.

9. The computer-implemented method of claim 7, further comprising comparing the quantitative characteristic with one or more predetermined threshold values.

10. The computer-implemented method of claim 7, wherein the medical image is of an implanted stent.

11. The computer-implemented method of claim 10, wherein the quantitative characteristic is elongation of the stent.

12. A system for enhancing a medical image, the system comprising:

an image processing module configured to select a region of interest in the medical image, and to crop the region of interest from the medical image to generate a cropped image;

an image background subtraction module configured to identify and subtract background pixels of the cropped image, and normalize a grayscale of the cropped image;

a contrast adjustment module configured to adjust contrast of the cropped image to generate a first enhanced image;

an output module configured to output the first enhanced image to a user; and the system comprising a process and memory.

13. The system of claim 12, further comprising:

a vertex locating module configured to identify a first vertex of a first cell in the stent within the first enhanced image, and identify a second vertex of the first cell in the stent within the first enhanced image;

a distance analysis module configured to determine a distance between the first and the second vertexes, wherein the distance represents stent elongation;

an assessment module configured to access a computer accessible index to determine whether the distance exceeds a threshold value for stent elongation; and wherein the output module is further configured to output a recommendation to the user related to the stent if the distance exceeds the threshold value.

14. The system of claim 12, further comprising:

an angle locating module configured to identify an angle formed within a cell in the stent within the first enhanced image;

an angle analysis module configured to determine a number of degrees in the angle;

an assessment module configured to access a computer accessible index to determine whether the number of degrees exceeds a threshold value for stent elongation; and wherein the output module is further configured to output a recommendation to the user related to the stent if the number of degrees exceeds the threshold value.

15. The system of claim 12, further comprising:

a line profile analysis module configured to determine the metal coverage of a line profile of the first enhanced image, wherein the line profile is taken across the width of the stent;

an assessment module configured to access a computer accessible index to determine whether the metal coverage is below a threshold value for stent elongation; and wherein the output module is configured to output a recommendation to the user related to the stent if the metal coverage is below the threshold value.

16. The system of claim 12, further comprising:

a data retrieval module configured to access a data repository to obtain a second medical image, wherein the second medical image comprises an image of the stent in situ at a different time;

wherein the image processing module is further configured to select a second region of interest in the second medical image, and to crop the second region of interest from the second medical image to generate a second cropped image;

wherein the image background subtraction module is further configured to identify and subtract background pixels of the second cropped image, and normalize a grayscale of the cropped image; wherein the contrast adjustment module is configured to adjust contrast of the cropped image to generate a second enhanced image; the system further comprising an image comparison module configured to determine one or more disparities between the second enhanced medical image and the first enhanced image; and wherein the output module is further configured to output the one or more disparities to the user.

17. A computer-implemented method for processing a medical image, the computer-implemented method comprising:

accessing, by a processor, a computer accessible database to obtain at least one medical image;

selecting a region of interest in the at least one medical image, wherein the region of interest comprises a vessel;

cropping the region of interest from the at least one medical image to generate a cropped image;

identifying background pixels of the cropped image;

subtracting the background pixels from the cropped image, wherein the subtracted pixels represent the background;

normalizing a grayscale of the cropped image;

adjusting contrast of the cropped image to generate an enhanced image; and outputting the enhanced image to the user.

18. The computer-implemented method of claim 17, further comprising:

determining a feature of the vessel within the enhanced image;

selecting a treatment modality by accessing a computer accessible index to compare the feature to threshold values stored in the computer accessible index; and outputting a treatment modality recommendation to the user based on the selecting.

19. The computer-implemented method of claim 18, wherein the treatment modality comprises at least one of: angioplasty, stenting, and atherectomy.

20. A system for generating an assessment report of an image, the system comprising:

a communications module for accessing a secure network connection between a remote image enhancement and analysis system;

a storage repository configured to store threshold values relating to specific devices or conditions;

a data manager module configured to receive data values from the remote image enhancement and analysis system through the communications module, and to store the data values in the storage repository; a threshold reassessment module configured to recalculate the threshold values based on data values related to the threshold values and to store recalculated threshold values in the storage repository; and an assessment module configured to receive a request and measured values from the remote image enhancement and analysis system through the communications module, wherein the request is to compare the measured values to related threshold values.

* * * * *